(12) United States Patent
Li et al.

(10) Patent No.: US 12,519,581 B2
(45) Date of Patent: Jan. 6, 2026

(54) USE EQUIPMENT, BASE STATION AND METHOD FOR FREQUENCY HOPPING

(71) Applicant: LENOVO (BEIJING) LIMITED, Beijing (CN)

(72) Inventors: Yingying Li, Beijing (CN); Zhi Yan, Beijing (CN); Hongmei Liu, Beijing (CN); Yuantao Zhang, Beijing (CN); Haiming Wang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 439 days.

(21) Appl. No.: 18/041,641

(22) PCT Filed: Aug. 17, 2020

(86) PCT No.: PCT/CN2020/109514
§ 371 (c)(1),
(2) Date: Feb. 14, 2023

(87) PCT Pub. No.: WO2022/036499
PCT Pub. Date: Feb. 24, 2022

(65) Prior Publication Data
US 2023/0318760 A1    Oct. 5, 2023

(51) Int. Cl.
*H04L 5/00* (2006.01)
*H04W 72/232* (2023.01)

(52) U.S. Cl.
CPC .......... *H04L 5/0012* (2013.01); *H04L 5/0092* (2013.01); *H04W 72/232* (2023.01)

(58) Field of Classification Search
CPC ..... H04L 5/001; H04L 5/0012; H04L 5/0064; H04L 5/0092; H04L 27/26025; H04L 27/2666; H04W 72/232
See application file for complete search history.

(56) References Cited

U.S. PATENT DOCUMENTS

| | | | |
|---|---|---|---|
| 10,939,384 B2 * | 3/2021 | Li | H04W 52/143 |
| 11,159,199 B2 * | 10/2021 | Takeda | H04B 1/7143 |
| 11,290,147 B2 * | 3/2022 | Liu | H04W 24/08 |
| 11,343,128 B2 * | 5/2022 | Zhang | H04J 13/0074 |

(Continued)

FOREIGN PATENT DOCUMENTS

| | | |
|---|---|---|
| CN | 111245590 A | 6/2020 |
| CN | 111406378 A | 7/2020 |

(Continued)

OTHER PUBLICATIONS

CATT. "Other aspects of 2-symbol short PUCCH" 3GPP TSG RAN WG1 Meeting 91 R1-1720196, Dec. 1, 2017; pp. 1-4.

(Continued)

*Primary Examiner* — Eric Nowlin
(74) *Attorney, Agent, or Firm* — AMPACC Law Group, PLLC

(57) ABSTRACT

The present application relates to a user equipment, a base station, and a method for frequency hopping. The base station transmits a first configuration of a first BWP and at least one parameter associated with at least one second BWP to the user equipment. The user equipment determines determining the at least one second BWP for frequency hopping according to the first configuration and the at least one parameter.

15 Claims, 19 Drawing Sheets

(56) References Cited

U.S. PATENT DOCUMENTS

| | | | | |
|---|---|---|---|---|
| 11,356,229 | B2* | 6/2022 | Jeon | H04W 24/08 |
| 11,382,121 | B2* | 7/2022 | Marinier | H04W 72/23 |
| 11,405,166 | B2* | 8/2022 | Zhou | H04W 24/08 |
| 11,470,614 | B1* | 10/2022 | Lei | H04W 72/044 |
| 11,601,177 | B2* | 3/2023 | Liu | H04L 5/005 |
| 11,601,943 | B2* | 3/2023 | Sakhnini | H04L 5/0012 |
| 11,696,269 | B2* | 7/2023 | Kwak | H04L 1/189 370/329 |
| 11,757,600 | B2* | 9/2023 | Sharma | H04W 48/16 375/133 |
| 11,799,616 | B2* | 10/2023 | Zhou | H04W 76/28 |
| 11,800,524 | B2* | 10/2023 | Marinier | H04L 1/1854 |
| 11,811,706 | B2* | 11/2023 | Jeon | H04W 72/23 |
| 11,825,495 | B2* | 11/2023 | Lei | H04B 1/713 |
| 11,831,482 | B2* | 11/2023 | Zhang | H04L 27/2613 |
| 11,855,685 | B2* | 12/2023 | Liu | H04W 72/0453 |
| 12,068,775 | B2* | 8/2024 | Wei | H04L 5/0012 |
| 12,167,404 | B2* | 12/2024 | Marinier | H04L 1/1896 |
| 12,177,824 | B2* | 12/2024 | Ma | H04J 11/0069 |
| 12,261,784 | B2* | 3/2025 | Dai | H04L 5/008 |
| 2019/0036665 | A1* | 1/2019 | Park | H04L 5/0091 |
| 2020/0008155 | A1* | 1/2020 | Li | H04W 52/10 |
| 2020/0196343 | A1* | 6/2020 | Marinier | H04L 5/0092 |
| 2020/0336269 | A1* | 10/2020 | Shen | H04L 5/0094 |
| 2021/0058111 | A1* | 2/2021 | Liu | H04W 72/0453 |
| 2021/0067194 | A1* | 3/2021 | Takeda | H04W 72/0453 |
| 2021/0075577 | A1* | 3/2021 | Zhang | H04J 11/005 |
| 2021/0160785 | A1* | 5/2021 | Li | H04W 72/0473 |
| 2021/0167930 | A1* | 6/2021 | Jeon | H04L 5/0098 |
| 2021/0218450 | A1* | 7/2021 | Liu | H04W 48/16 |
| 2021/0336750 | A1* | 10/2021 | Zhou | H04W 76/28 |
| 2021/0345328 | A1* | 11/2021 | Sakhnini | H04L 5/0085 |
| 2022/0007399 | A1* | 1/2022 | Rastegardoost | H04L 1/1861 |
| 2022/0224374 | A1* | 7/2022 | Liu | H04L 5/0023 |
| 2022/0247610 | A1* | 8/2022 | Zhang | H04J 11/005 |
| 2022/0279561 | A1* | 9/2022 | Marinier | H04L 5/0094 |
| 2022/0294595 | A1* | 9/2022 | Jeon | H04W 24/08 |
| 2022/0322345 | A1* | 10/2022 | Kwak | H04W 72/0453 |
| 2022/0352923 | A1* | 11/2022 | Xu | H04L 5/001 |
| 2022/0368508 | A1* | 11/2022 | Zhou | H04L 5/0092 |
| 2022/0369317 | A1* | 11/2022 | Ma | H04L 5/0048 |
| 2023/0031875 | A1* | 2/2023 | Dai | H04L 5/0012 |
| 2023/0034062 | A1* | 2/2023 | Wei | H04L 5/0012 |
| 2023/0044511 | A1* | 2/2023 | Lei | H04L 5/0092 |
| 2023/0055018 | A1* | 2/2023 | He | H04W 72/23 |
| 2023/0072549 | A1* | 3/2023 | Dai | H04L 5/0092 |
| 2023/0084448 | A1* | 3/2023 | Sharma | H04B 1/7143 375/133 |
| 2023/0084494 | A1* | 3/2023 | Wei | H04L 5/0044 370/329 |
| 2023/0156714 | A1* | 5/2023 | Marinier | H04L 5/0092 370/330 |
| 2023/0247628 | A1* | 8/2023 | Liu | H04L 5/0053 370/329 |
| 2023/0283438 | A1* | 9/2023 | Zhang | H04L 5/0053 370/329 |
| 2023/0328704 | A1* | 10/2023 | Oh | H04W 72/232 370/329 |
| 2023/0354348 | A1* | 11/2023 | Kim | H04W 72/0457 |
| 2024/0146473 | A1* | 5/2024 | Li | H04L 5/0044 |
| 2024/0155519 | A1* | 5/2024 | Kumagai | H04W 56/0015 |
| 2025/0096959 | A1* | 3/2025 | Sakhnini | H04L 5/0007 |

FOREIGN PATENT DOCUMENTS

| | | | | |
|---|---|---|---|---|
| CN | 114946247 A | * | 8/2022 | H04B 1/713 |
| CN | 118947092 A | * | 11/2024 | H04L 5/0092 |
| CN | 114946257 B | * | 2/2025 | H04W 72/1268 |
| CN | 115462029 B | * | 3/2025 | H04L 5/0085 |
| EP | 4175386 A1 | * | 5/2023 | H04L 27/26025 |
| EP | 4270843 A2 | * | 11/2023 | H04L 5/0053 |
| KR | 20230153232 A | * | 11/2023 | H04W 72/1273 |
| KR | 20250039359 A | * | 3/2025 | H04L 5/0092 |
| WO | WO-2021222841 A1 | * | 11/2021 | H04L 5/0012 |

OTHER PUBLICATIONS

International Search Report and Written Opinion dated May 14, 2021 for International Application PCT /CN2020/109514.

* cited by examiner

Determining a second bandwidth, a second cyclic prefix and a second subcarrier spacing of the specific second BWP for frequency hopping according to a first bandwidth, a first cyclic prefix and a first subcarrier spacing of the first BWP
S803A

FIG. 8B

Determining a specific parameter for the specific second BWP according to a corresponding parameter of the first configuration or according to a default parameter
S803B

FIG. 8C

USE EQUIPMENT, BASE STATION AND METHOD FOR FREQUENCY HOPPING

CROSS REFERENCE TO RELATED APPLICATIONS

This application is a national phase entry of International Application No. PCT/CN2020/109514, filed on Aug. 17, 2020, which is incorporated by reference in its entirety.

TECHNICAL FIELD

The present disclosure generally relates to a user equipment, a base station and a method for frequency hopping, and relates more particularly to a user equipment, a base station and a method for frequency hopping across wider frequency range.

BACKGROUND OF THE INVENTION

In conventional network, frequency hopping procedure within a bandwidth part (BWP) is introduced. Nevertheless, reduced capability (RedCap) user equipment (UE) cannot get enough frequency diversity by legacy frequency hopping procedure within a limited frequency range (e.g., 20 MHz BWP).

Accordingly, different from frequency hopping procedure within a BWP, frequency hopping procedure across wider frequency range is developed. However, specific details of frequency hopping procedure across different BWPs have not been discussed yet and there are still some issues that need to be solved.

BRIEF SUMMARY OF THE INVENTION

One embodiment of the present disclosure provides a method of a user equipment. The method includes: receiving a first configuration of a first bandwidth part (BWP); and determining at least one second BWP for frequency hopping according to the first configuration and at least one parameter associated with the at least one second BWP.

Another embodiment of the present disclosure provides a method of a base station. The method includes: transmitting a first configuration of a first BWP and a second configuration of a specific second BWP of at least one second BWP, wherein the first configuration includes a first frequency domain location of the first BWP, the second configuration includes at least one parameter associated with the specific second BWP, and the at least one parameter includes a BWP identifier and an offset so that a user equipment is capable of determining a second frequency domain location of the second BWP for hopping according to the first frequency domain location of the first BWP and the offset.

Yet another embodiment of the present disclosure provides a method of a base station. The method includes: transmitting a first configuration of a first BWP, wherein the first configuration includes a first frequency domain location of the first BWP and at least one parameter associated with a specific second BWP of at least one second BWP, and the at least one parameter includes an offset so that a user equipment is capable of determining a second frequency domain location of the second BWP for hopping according to the first frequency domain location of the first BWP and the offset.

Yet another embodiment of the present disclosure provides a method of a base station. The method includes: transmitting an indicator of a frequency hopping pattern across BWPs so that a user equipment is capable of determining a frequency hopping pattern across BWPs according to the indicator.

Yet another embodiment of the present disclosure provides an apparatus. According to an embodiment of the present disclosure, the apparatus includes: at least one non-transitory computer-readable medium having computer executable instructions stored therein; at least one receiving circuitry; at least one transmitting circuitry; and at least one processor coupled to the at least one non-transitory computer-readable medium, the at least one receiving circuitry and the at least one transmitting circuitry, wherein the at least one non-transitory computer-readable medium and the computer executable instructions are configured to, with the at least one processor, cause the apparatus to perform a method according to an embodiment of the present disclosure.

BRIEF DESCRIPTION OF THE DRAWINGS

In order to describe the manner in which advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

FIGS. 8A to 8D illustrate flow charts of a method for wireless communications according to an embodiment of the present disclosure.

DETAILED DESCRIPTION OF THE INVENTION

The detailed description of the appended drawings is intended as a description of preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Figure 1:
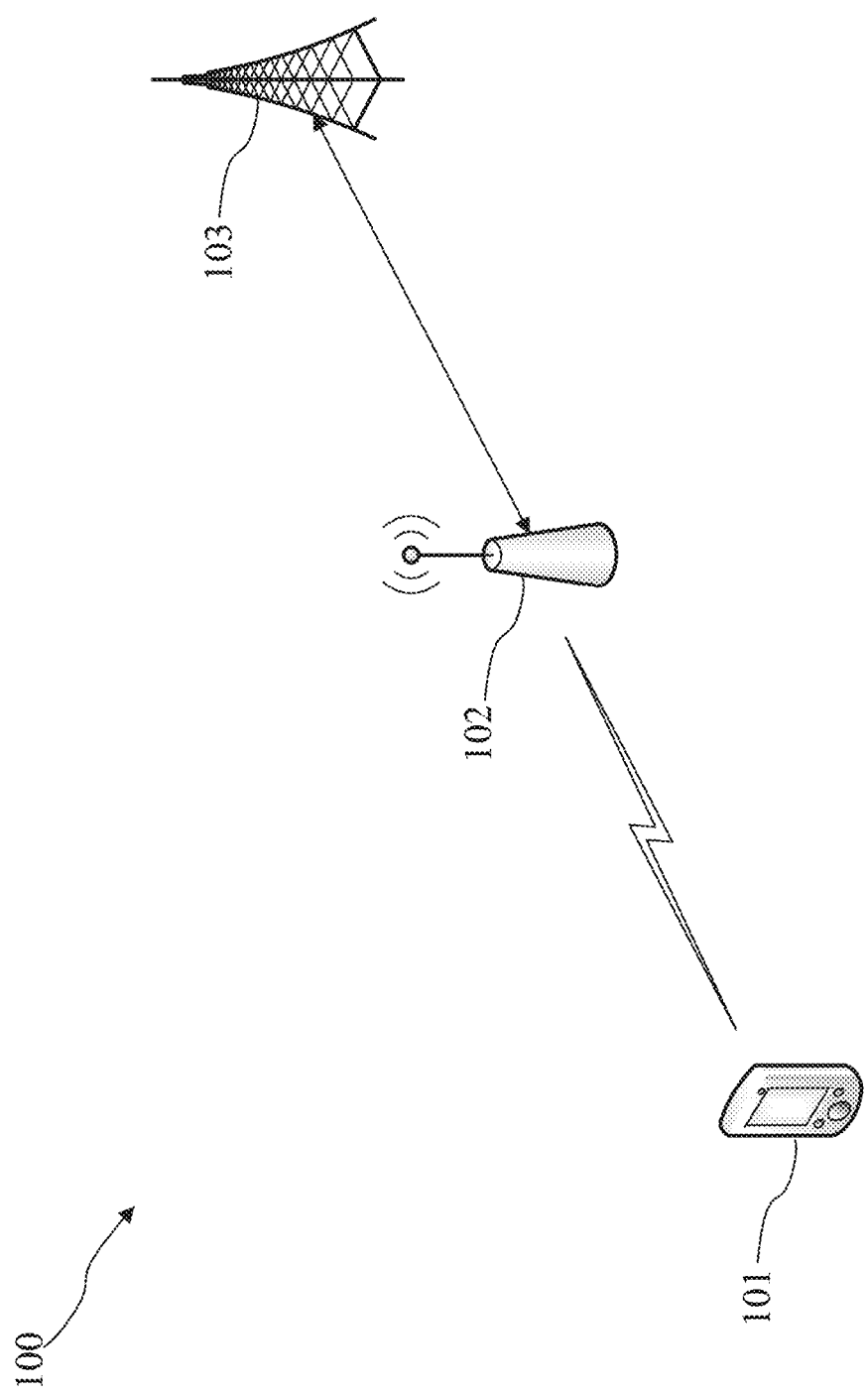
FIG. 1 illustrates a wireless communication system according to an embodiment of the present disclosure.

Referring to FIG. 1, a wireless communication system 100 may include a user equipment (UE) 101, a base station (BS) 102 and a core network (CN) 103. Although a specific number of the UE 101, the BS 102 and the CN 103 are depicted in FIG. 1, it is contemplated that any number of the UEs 101, the BSs 102 and the CNs 103 may be included in the wireless communication system 100.

The CN 103 may include a core Access and Mobility management Function (AMF) entity. The BS 102, which may communicate with the CN 103, may operate or work under the control of the AMF entity. The CN 103 may further include a User Plane Function (UPF) entity, which communicatively coupled with the AMF entity.

The BS 102 may be distributed over a geographic region. In certain embodiments of the present application, the BS 102 may also be referred to as an access point, an access terminal, a base, a base unit, a macro cell, a Node-B, an evolved Node B (eNB), a gNB, a Home Node-B, a relay node, or a device, or described using other terminology used in the art. The BS 102 is generally part of a radio access network that may include one or more controllers communicably coupled to one or more corresponding BS(s).

The UE 101 may include, for example, but is not limited to, computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), Internet of Thing (IoT) devices, or the like.

According to some embodiments of the present application, the UE 101 may include, for example, but is not limited to, a portable wireless communication device, a smart phone, a cellular telephone, a flip phone, a device having a subscriber identity module, a personal computer, a selective call receiver, or any other device that is capable of sending and receiving communication signals on a wireless network.

In some embodiments of the present application, the UE 101 may include, for example, but is not limited to, wearable devices, such as smart watches, fitness bands, optical head-mounted displays, or the like. Moreover, the UE 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UE 101 may communicate directly with the BS 102 via uplink communication signals.

The wireless communication system 100 may be compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 3GPP-based network, a 3GPP 5G network, a satellite communications network, a high altitude platform network, and/or other communications networks.

In some embodiments of the present application, the wireless communication system 100 is compatible with the 5G New Radio (NR) of the 3GPP protocol or the 5G Reduced capability NR of the 3GPP protocol, wherein the BSs 102 transmit data using an OFDM modulation scheme on the downlink (DL) and the UE 101 transmit data on the uplink (UL) using a single-carrier frequency division multiple access (SC-FDMA) or OFDM scheme. More generally, however, the wireless communication system 100 may implement some other open or proprietary communication protocols, for example, WiMAX, among other protocols.

In some embodiments of the present application, the BS 102 may communicate using other communication protocols, such as the IEEE 802.11 family of wireless communication protocols. Further, in some embodiments of the present application, the BS 102 may communicate over licensed spectrums, whereas in other embodiments the BS 102 may communicate over unlicensed spectrums. The present application is not intended to be limited to the implementation of any particular wireless communication system architecture or protocol. In yet some embodiments of present application, the BS 102 may communicate with the UE 101 using the 3GPP 5G protocols.

According to some existed agreements, the UE 101 may perform frequency hopping procedure across wider frequency range. In particular, the UE 101 may perform frequency hopping procedure across different bandwidth parts (BWPs). However, specific details have not been discussed yet and there are still some issues that need to be solved.

Figure 2:
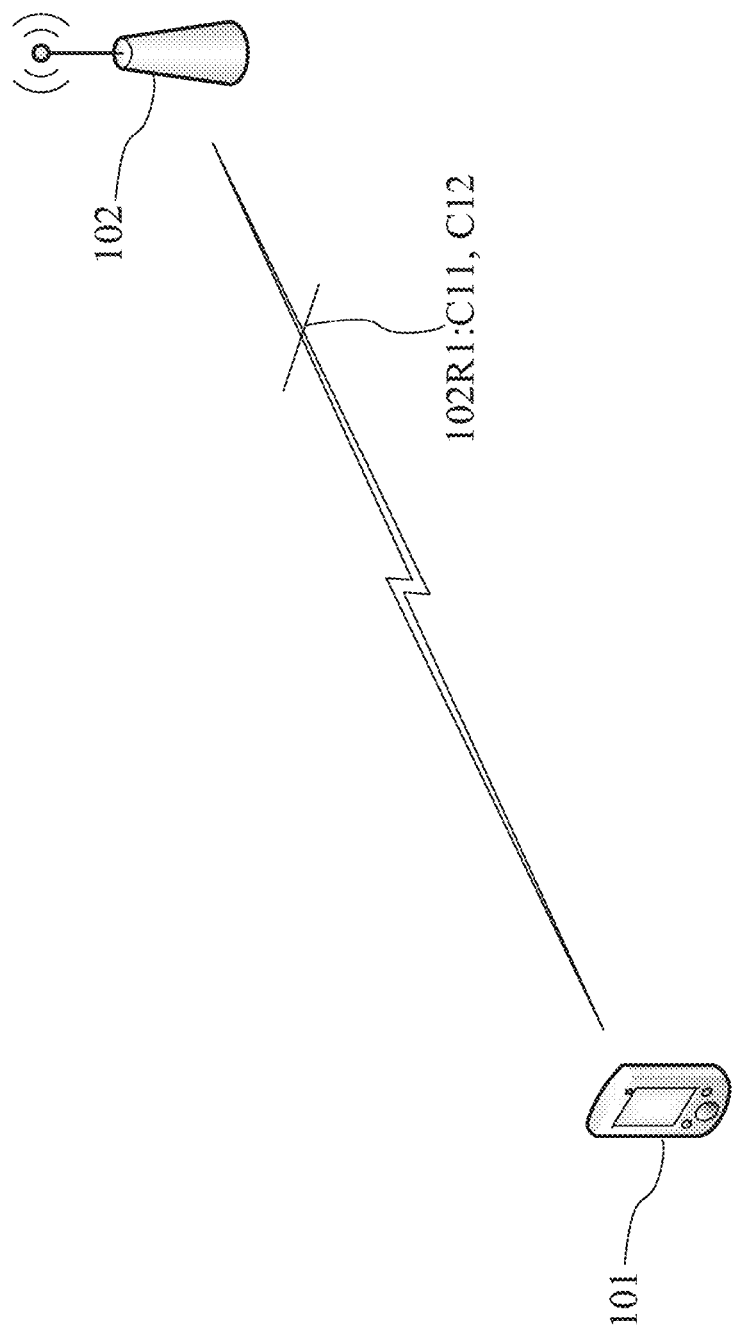
FIG. 2 illustrates message transmission between a base station and a user equipment according to an embodiment of the present disclosure.

In some embodiments, for performing frequency hopping procedure across BWPs, different BWPs may be configured by different configurations. In detail, referring to FIG. 2, the BS 102 may transmit a radio resource control (RRC) message 102R1 to the UE 101. The RRC message 102R1 may include a first configuration C11 of a first BWP and at least one second configuration of at least one second BWP.

In particular, the first configuration C11 may include parameters, associated with the first BWP, of a normal BWP configuration (e.g., uplink transmission configuration of BWP-uplink or downlink transmission configuration of BWP-downlink defined in 3GPP specifications). The at least one second configuration may include a second configuration C12 of a specific second BWP. The second configuration C12 may include at least one parameter associated with the specific second BWP for frequency hopping.

After receiving the RRC message 102R1, the UE 101 may determine the first BWP according to the parameters of the first configuration C11, and may determine the specific second BWP for frequency hopping according to some parameters of the first configuration C11 and the at least one parameter of the second configuration C12.

In some implementations, the first configuration C11 may include a first frequency domain location of the first BWP, and the at least one parameter of the second configuration C12 may include a BWP identifier and an offset. Accordingly, after receiving the RRC message 102R1 including the first configuration C11 and the second configuration C12, the UE 101 may determine the first frequency domain location of the first BWP and may determine a second frequency domain location of the specific second BWP according to the first frequency domain location and the offset. More specifically, the UE 101 may shift the first frequency domain location by the offset for determining the second frequency domain location of the specific second BWP.

In some implementations, the first configuration C11 may include a first bandwidth, a first cyclic prefix and a first subcarrier spacing of the first BWP. Accordingly, the UE 101 may determine the first bandwidth, the first cyclic prefix and the first subcarrier spacing of the first BWP. The UE 101 may determine a second bandwidth, a second cyclic prefix and a second subcarrier spacing of the specific second BWP according to the first bandwidth, the first cyclic prefix and the first subcarrier spacing as well. More specifically, the second bandwidth, the second cyclic prefix and the second subcarrier spacing of the specific second BWP may be the same as the first bandwidth, the first cyclic prefix and the first subcarrier spacing of the first BWP.

In some implementations, the second configuration C12 may include some specific parameters (e.g., some uplink transmission parameters of SRS-Config, PUSCH-Config, PUSCH-ConfigCommon, PUCCH-Config and PUCCH-ConfigCommon, or some downlink transmission parameter CSI-ResourceConfig, PDSCH-Config, PDSCH-Config-Common, PDCCH-Config and PDCCH-ConfigCommon defined in 3GPP specifications) of the specific second BWP. Therefore, the UE 101 may determine the specific parameters of the specific second BWP according to the second configuration C12. On the other hand, the second configuration C12 may be without the specific parameters of the specific second BWP (i.e., the specific parameters may be absent in the second configuration C12). Therefore, the UE 101 may determine the specific parameters of the specific second BWP according to corresponding specific parameters of the first configuration or according to default parameters.

In some implementations, the second configuration C12 may include some or none of specific parameters of control channel configurations (e.g., uplink control channel configuration of PUCCH-Config and PUCCH-ConfigCommon, or downlink control channel configuration of PDCCH-Config and PDCCH-ConfigCommon defined in 3GPP specifications) of the specific second BWP. Therefore, the UE 101 may determine the specific second BWP without the specific parameters of the control channel configurations. More specifically, the UE 101 may not transmit PUCCH or receive PDCCH on the specific second BWP.

For example, the specific parameters of SRS-Config may be determined according to the corresponding specific parameters of the first configuration or according to default parameters, except for frequency domain shift and slot offset (time domain shift) of SRS-Config, which means that the parameter of frequency domain shift and slot offset (time domain shift) of SRS-Config should be configured in the second configuration C12.

For another example, some specific parameters of PUSCH-Config and PUSCH-ConfigCommon, which may affect PUSCH transmission, such as pusch-AggregationFactor and pusch-TimeDomainAllocationList, may be determined according to the corresponding specific parameters of the first configuration or according to default parameters, which means that the parameters of pusch-AggregationFactor and pusch-TimeDomainAllocationList should be absent in the second configuration C12.

For another example, in some scenarios, the specific second BWP is only used for PUSCH frequency hopping. Therefore, the UE 101 transmit PUSCH and Sounding Reference Signal (SRS) on the specific second BWP. In these scenarios, the UE 101 is capable of transmitting PUCCH on the first BWP while PUSCH and SRS are transmitted on the specific second BWP, which means that the UE 101 should monitor two active BWPs. Alternatively, the UE 101 should monitor only one active BWP. When the monitored active BWP is the specific second BWP (i.e., when the UE 101 hops to the specific second BWP), the UE 101 should drop or delay PUCCH on the first BWP which is not under monitoring.

In some implementations, the RRC message 102R1 may include a frequency hopping periodicity. The BS 102 may transmit a downlink control information (DCI). The DCI may include an indicator of a BWP group for frequency hopping. The BWP group may include the first BWP and the at least one second BWP. Then, the UE 101 may hop sequentially among the first BWP and the at least one second BWP of the BWP group and may perform a hop every frequency hopping periodicity.

It should be noted that there may be a time gap when hopping from one BWP to another BWP, and the number of time gaps (i.e., the number of the hops) may affect the transmission efficiency. Accordingly, for improving the transmission efficiency, the frequency hopping periodicity may be introduced to reduce the number of time gaps.

Figure 3A:
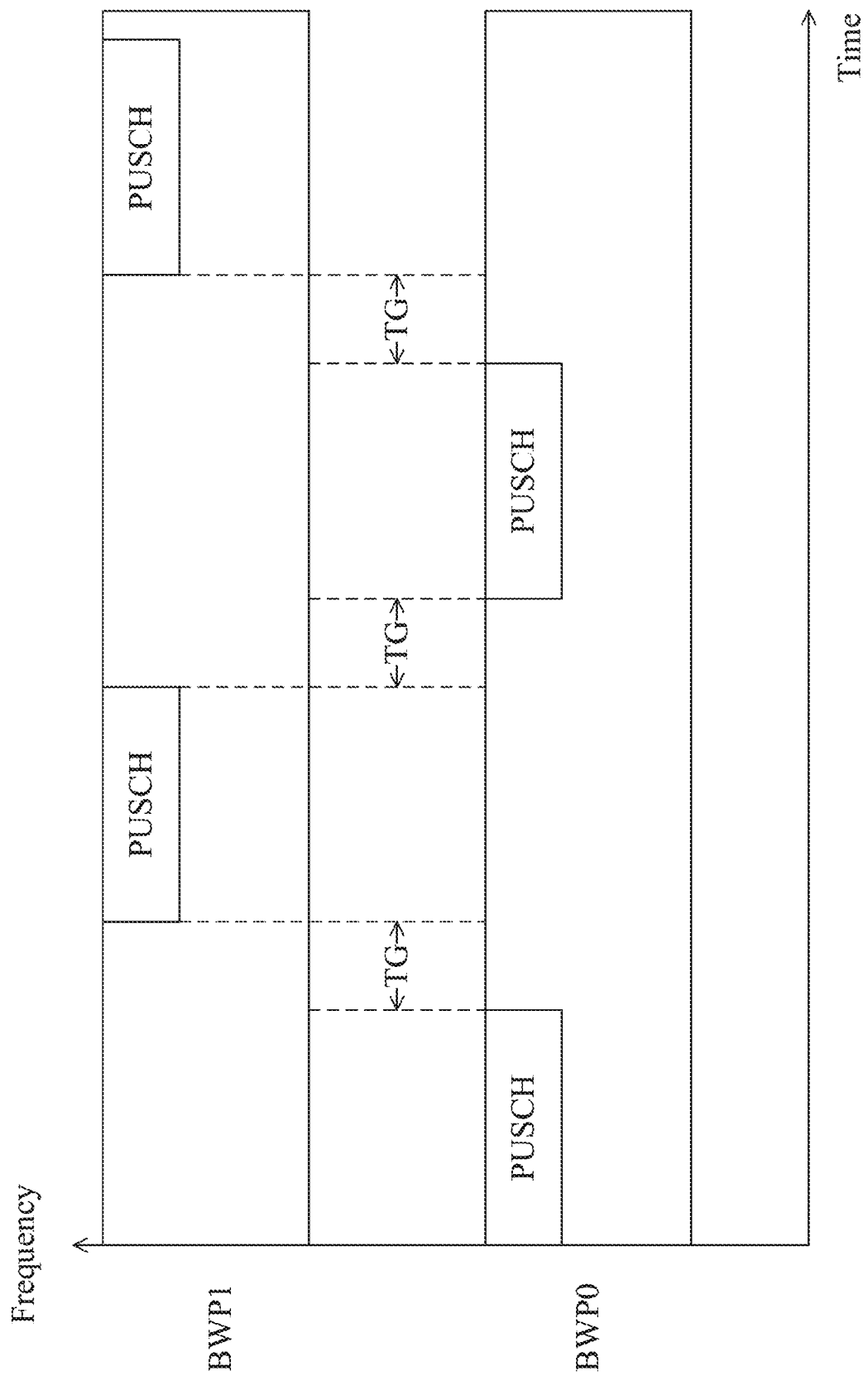
FIG. 3A illustrates a bandwidth part hopping according to an embodiment of the present disclosure.
Figure 3B:
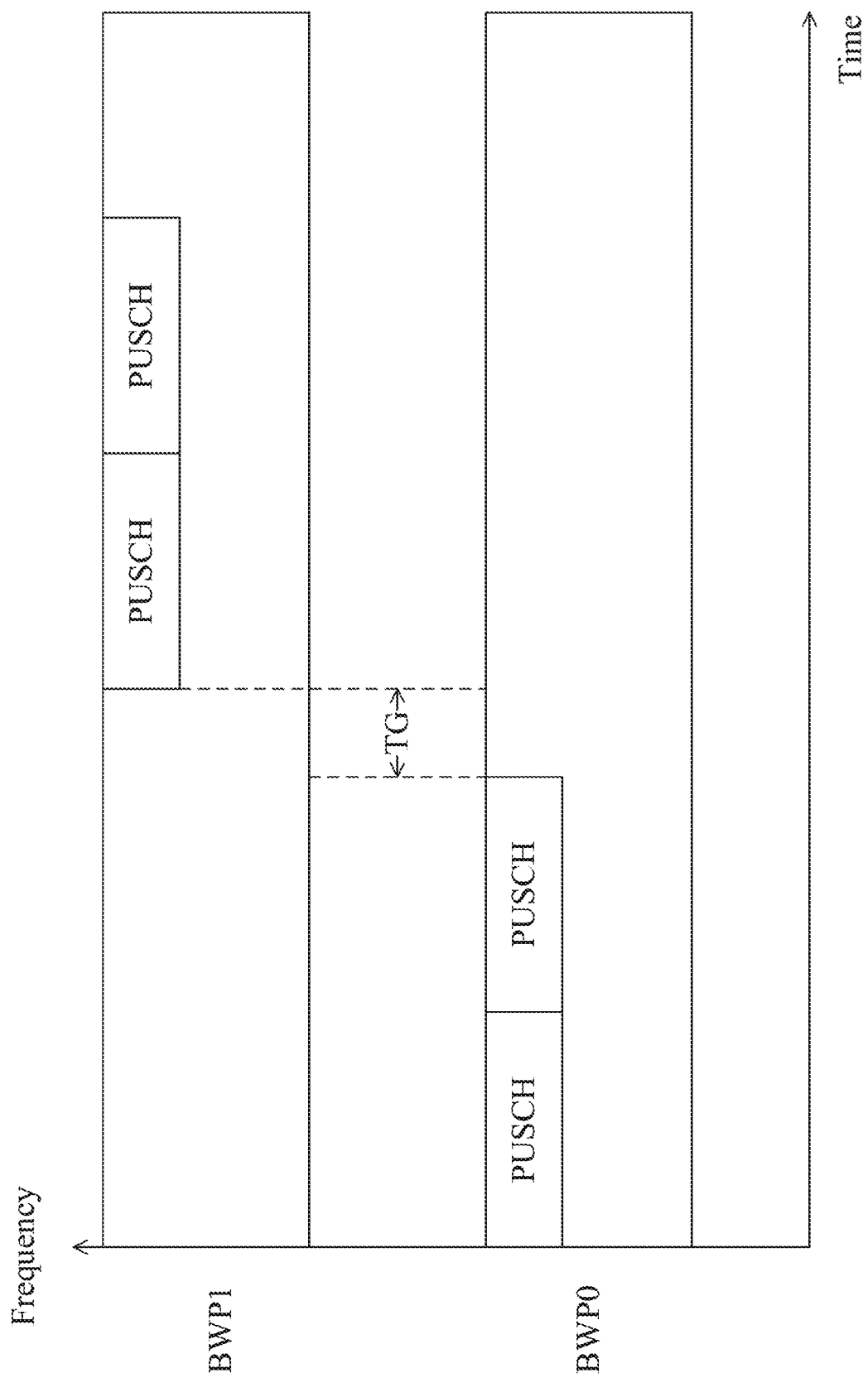
FIG. 3B illustrates a bandwidth part hopping according to an embodiment of the present disclosure.
Figure 3C:
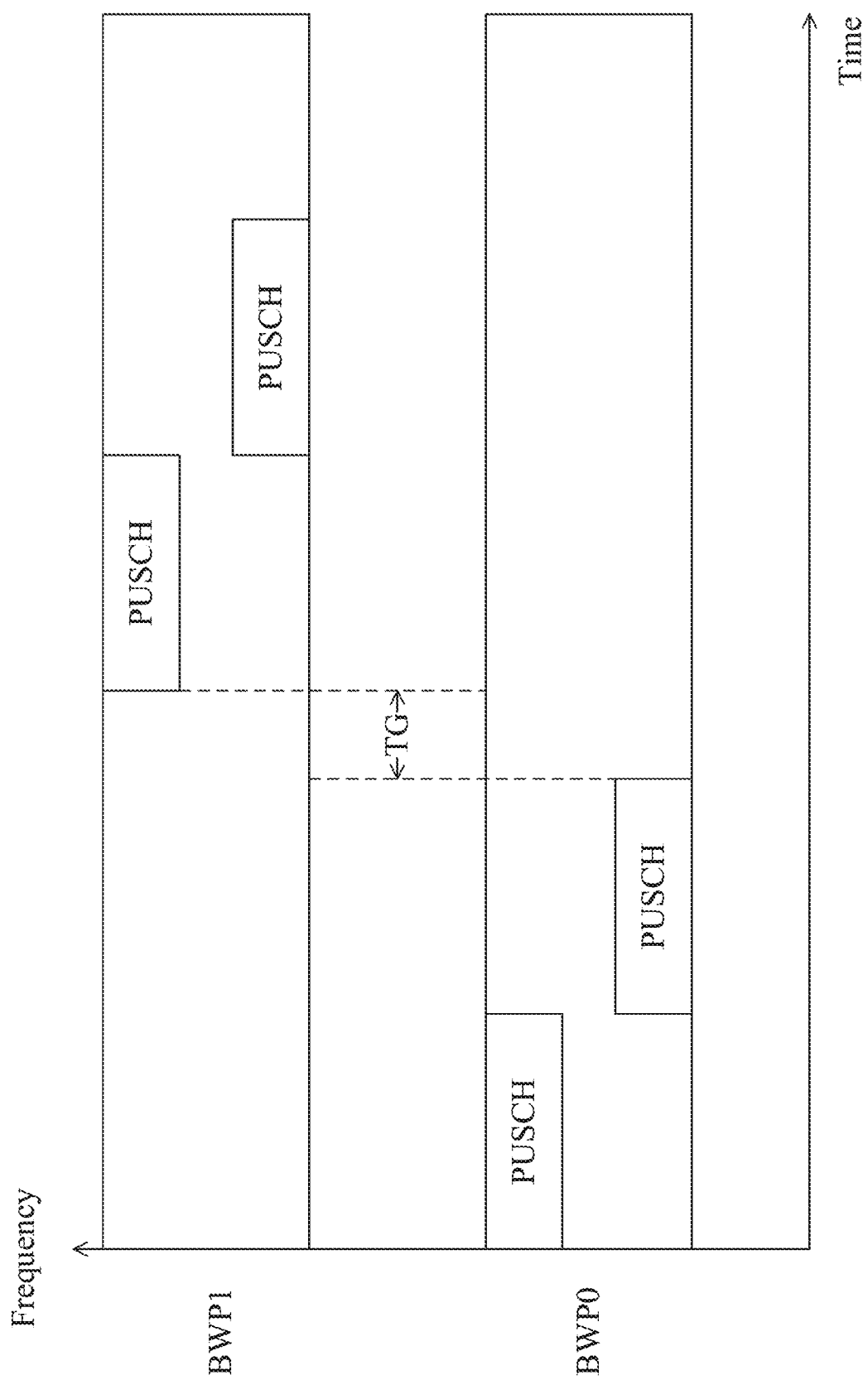
FIG. 3C illustrates a bandwidth part hopping according to an embodiment of the present disclosure.

For example, as shown in FIG. 3A, when there are 4 PUSCHs and the UE 101 hops between 'BWP0' and 'BWP1' every period of one PUSCH (i.e., the frequency hopping periodicity includes a period of one PUSCH), there are at least 3 time gaps TG. As shown in FIG. 3B, when there are 4 PUSCHs and the UE 101 hops between 'BWP0' and 'BWP1' every period of two PUSCHs (i.e., the frequency hopping periodicity includes a period of two PUSCHs), number of time gaps TG is reduced as 1. As shown in FIG. 3C, when there are 4 PUSCHs and the UE 101: (1) hops within the same BWP every period of one PUSCH; and (2) hops between 'BWP0' and 'BWP1' every period of two PUSCHs (i.e., the frequency hopping periodicity includes a period of two PUSCHs), number of time gaps TG is reduced as 1.

Figure 4:
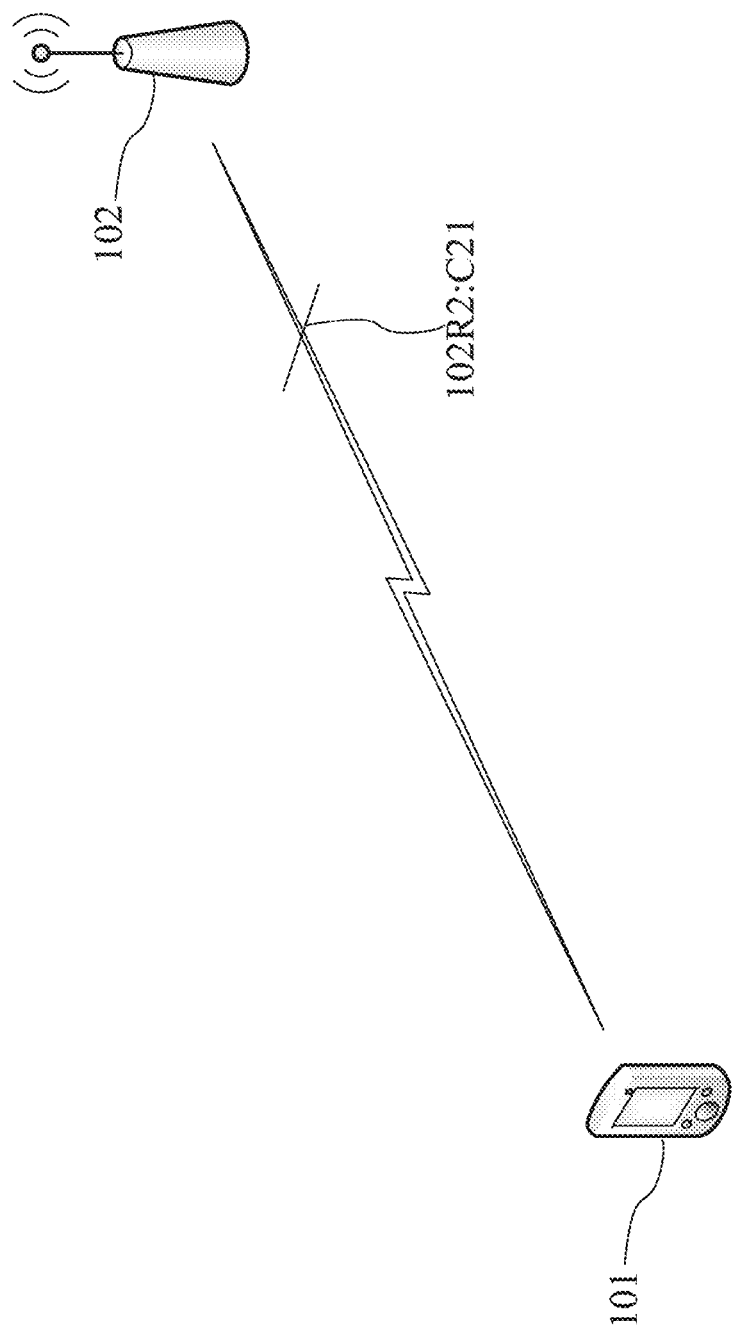
FIG. 4 illustrates message transmission between a base station and a user equipment according to an embodiment of the present disclosure.

In some embodiments, for performing frequency hopping procedure across BWPs, different BWPs may be configured by a configuration of BWP and additional parameters in the configuration of BWP. In detail, referring to FIG. 4, the BS 102 may transmit an RRC message 102R2 to the UE 101. The RRC message 102R2 may include a first configuration C21 of the first BWP. In addition to original parameters associated with the first BWP, the first configuration C21 may further include the at least one parameter associated with the specific second BWP of the at least one second BWP.

After receiving the RRC message 102R2, the UE 101 may determine the first BWP according to the original parameters of the first configuration C21, and may determine the specific second BWP for frequency hopping according to the original parameters and the at least one parameter of first configuration C21.

In some implementations, the first configuration C21 may include the first frequency domain location of the first BWP, and the at least one additional parameter may include an offset. Accordingly, after receiving the RRC message 102R2 including the first configuration C21, the UE 101 may determine the first frequency domain location of the first BWP and may determine the second frequency domain location of the specific second BWP according to the first frequency domain location and the offset. More specifically, the UE 101 may shift the first frequency domain location by the offset for determining the second frequency domain location of the specific second BWP.

In some implementations, the at least one parameter of the first configuration C21 may include some specific parameters (e.g., some uplink transmission parameters of SRS-Config, PUSCH-Config and PUSCH-ConfigCommon, or some downlink transmission parameter CSI-ResourceConfig, PDSCH-Config and PDSCH-ConfigCommon defined in 3GPP specifications) of the specific second BWP. Therefore, the UE 101 may determine the specific parameters of the specific second BWP according to the at least one parameter of the first configuration C21. On the other hand, the at least one parameter may be without the specific parameters of the specific second BWP (i.e., the at least one parameter may not include any of the specific parameters). Therefore, the UE 101 may determine the specific parameters of the specific second BWP according to corresponding specific parameters of the first configuration C21 or according to default parameters.

In some implementations, the at least one parameter of the first configuration C21 may only include the offset. In other words, except for the offset, the at least one parameter of the first configuration C21 may not include any of the specific parameters (e.g., parameters of SRS-Config, PUSCH-Config, PUSCH-ConfigCommon, PUCCH-Config and PUCCH-ConfigCommon) of the specific second BWP.

Figure 5:
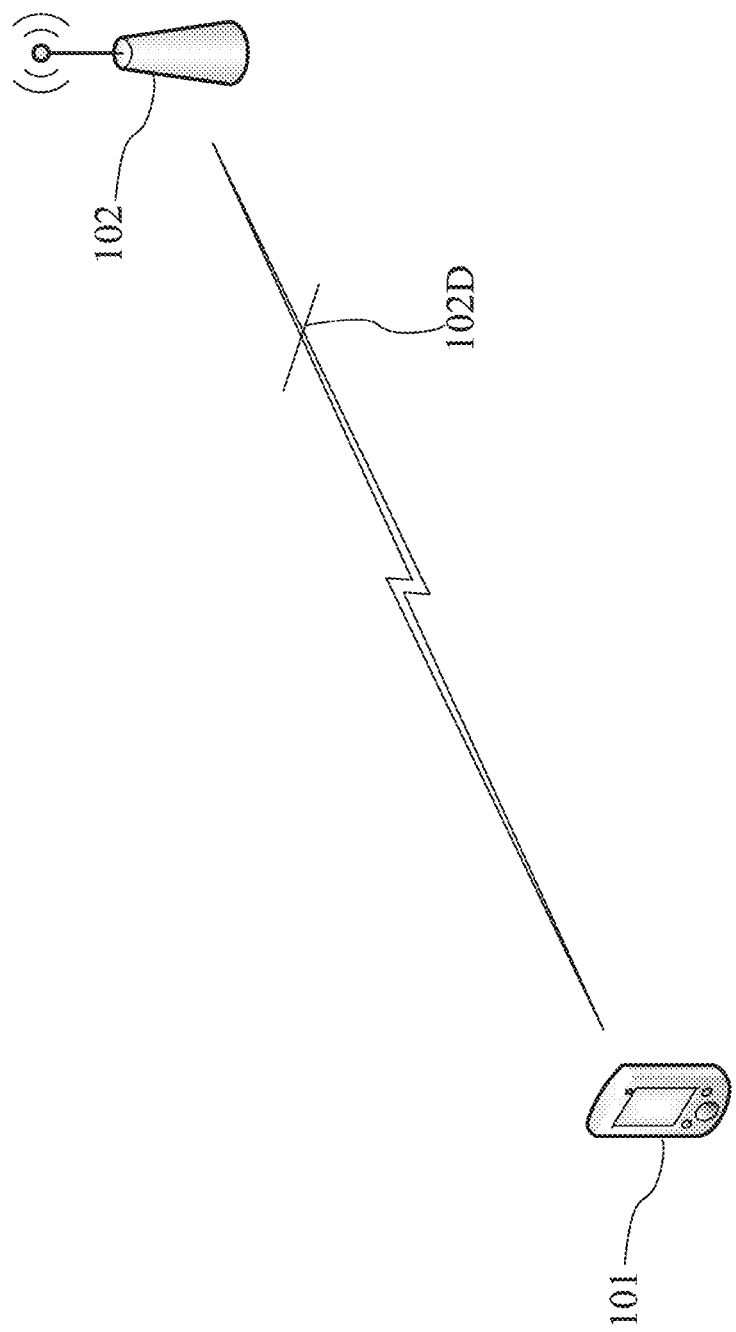
FIG. 5 illustrates message transmission between a base station and a user equipment according to an embodiment of the present disclosure.

In some embodiments, indicator may be introduced in DCI for determining frequency hopping pattern across BWPs. In detail, referring to FIG. 5, the BS 102 may transmit a DCI 102D. The DCI 102D may include an indicator of a frequency hopping pattern across BWPs. Then, the UE 101 may receive the DCI 102D, and may determine the frequency hopping pattern across BWPs according to the indicator.

In some implementations, the indicator may include a number N of most significant bit (MSB) bits of "frequency domain resource assignment" field (which is defined in 3GPP specifications) of the DCI 102D. In particular, the UE 101 may reinterpret the number N of MSB bits of "frequency domain resource assignment" field of the DCI 102D for deriving a value and this value may indicate a BWP for frequency hopping or indicate a BWP pattern for frequency hopping. The number N may be determined according to number of BWP configured to the UE 101 or according to number of BWP group configured to the UE 101.

In some implementations, the indicator may be "bandwidth part indicator" field (which is defined in 3GPP specifications) of the DCI 102D. In particular, the UE 101 may reinterpret "bandwidth part indicator" field (which is defined in 3GPP specifications) of the DCI 102D for deriving a value and this value may indicate a BWP for frequency hopping or indicate a BWP pattern for frequency hopping. In addition, a new flag bit may be introduced in DCI 102D to indicate "bandwidth part indicator" field used for BWP switching or frequency hopping.

Figure 6A:
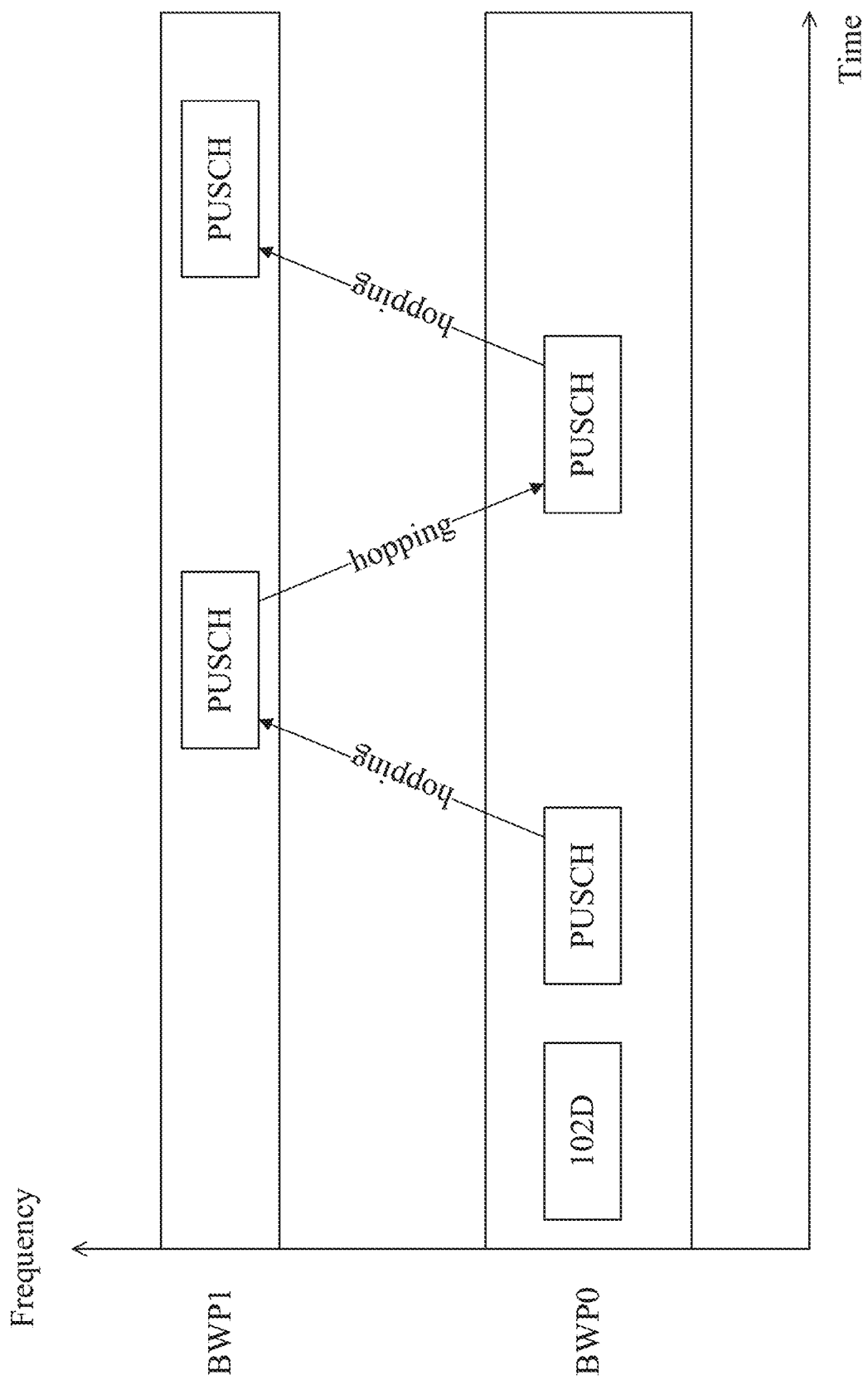
FIG. 6A illustrates a bandwidth part hopping pattern according to an embodiment of the present disclosure.

For example, the indicator indicates a BWP for hopping. Please refer to FIG. 6A, the UE 101 receives the DCI 102D on 'BWP0' and the indicator of the DCI 102D indicates 'BWP1' for hopping. Accordingly, the UE 101 transmits PUSCH between 'BWP0' (on which the DCI 102D is received) and 'BWP1' (on which the indicator indicates to).

Figure 6B:
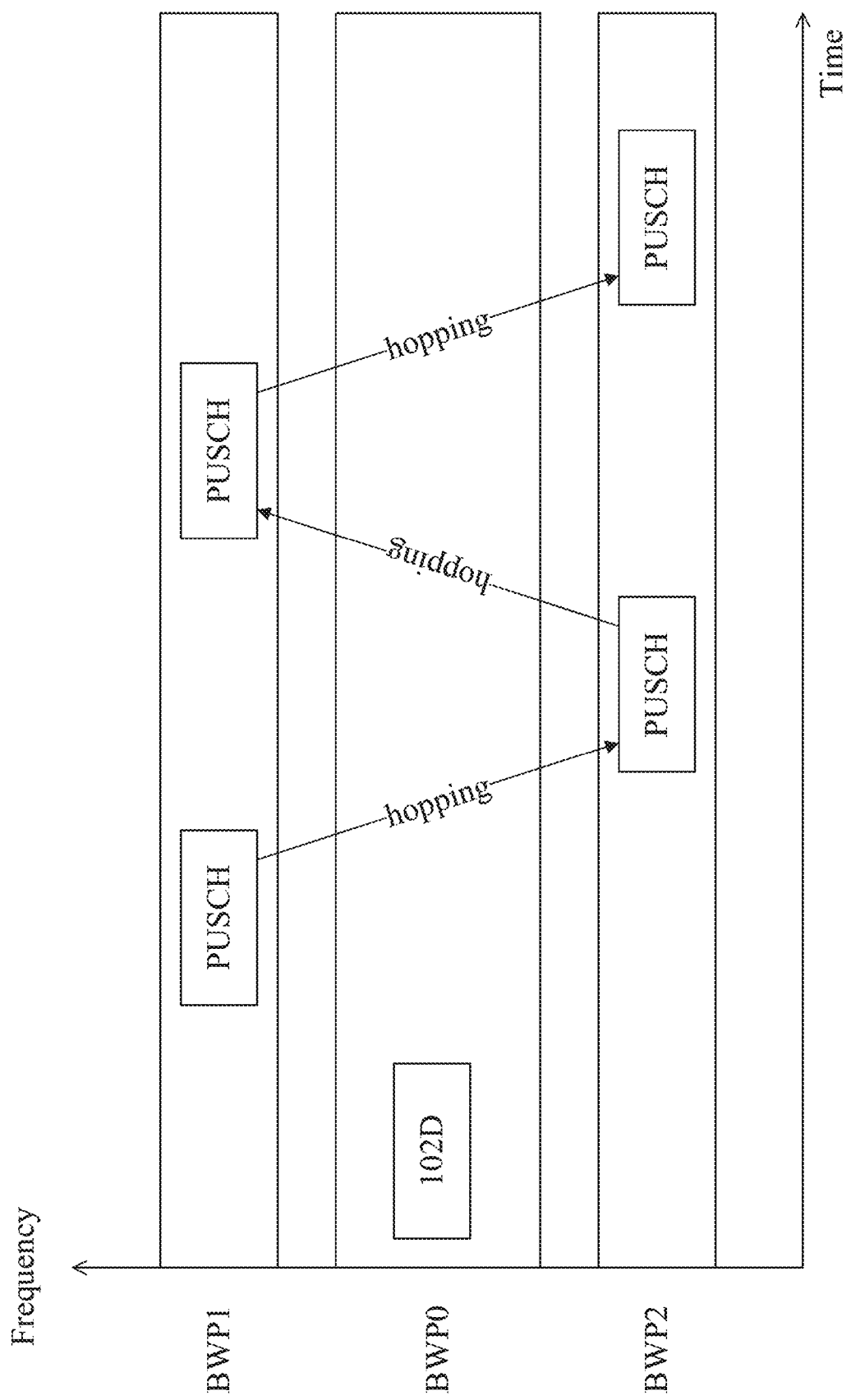
FIG. 6B illustrates a bandwidth part hopping pattern according to an embodiment of the present disclosure.

For example, the indicator indicates a BWP pattern for hopping. Please refer to FIG. 6B, the UE 101 receives the DCI 102D on 'BWP0' and the indicator indicates BWP pattern of 'BWP1→BWP2' for hopping. Accordingly, after receiving the DCI 102D, the UE 101 transmits PUSCH between 'BWP1' and 'BWP2'.

In some embodiments, indicator may be introduced in RRC message for determining frequency hopping pattern across BWPs. In detail, the RRC message 102R1 or 102R2 may include an indicator of a frequency hopping pattern across BWPs. Then, after receiving the RRC message 102R1 or 102R2, the UE 101 may determine the frequency hopping pattern across BWPs according to the indicator. For example, the indicator of the RRC message 102R1 indicates that 'BWP1' is a hopping BWP for 'BWP0'.

In some embodiments, for conforming resource allocations used in different BWPs with different frequency ranges, different strategies may be applied. In detail, the UE 101 may determine a first resource within the first BWP and a second resource within the specific second BWP. Then, the UE 101 may determine a third resource within the first BWP or within the specific second BWP according to the first resource and the second resource.

In some implementations, a number of frequency domain resource of the third resource may be determined according to the smaller size of frequency domain resource of the first resource and frequency domain resource of the second resource. A starting frequency domain resource of the third resource is same with the first resource or the second resource. A number of time domain resource of the third resource may be determined according to the smaller size of time domain resource of the first resource and time domain resource of the second resource. A starting time domain resource of the third resource is same with the first resource or the second resource.

With respect to frequency domain, a number of frequency domain resource of the third resource may be determined according to the smaller one of frequency domain resource of the first resource of the first BWP and frequency domain resource of the second resource of the specific second BWP. In particular, the UE 101 may determine which of a number 'F11' of frequency domain resource of the first resource and a number 'F12' of frequency domain resource of the second resource is smaller. When 'F11' is smaller than 'F12', the UE 101 may determine a number 'F13' of frequency domain resource of the third resource as the same as 'F11'. When 'F12' is smaller than 'F11', the UE 101 may determine the number 'F13' as the same as 'F12'.

Alternatively, frequency domain resource of the third resource may be determined according to the smaller one of frequency domain resource of the first BWP and frequency domain resource of the specific second BWP. In particular, the UE 101 may determine which of a number 'f11' of frequency domain resource of the first BWP and a number 'f12' of frequency domain resource of the specific second BWP is smaller. When 'f11' is smaller than 'f12', the UE 101 may determine the number 'F13' and a starting frequency domain resource of the third resource by replacing $N_{BWP}^{size}$ of the definition of resource indication value (RIV) (e.g. the following formula defined in 3GPP specification) with 'f11'. When 'f12' is smaller than 'f11', the UE 101 may determine the number 'F13' and a starting frequency domain resource of the third resource by replacing the size of BWP (e.g. $N_{BWP}^{size}$) of the definition of resource indication value (RIV) (e.g. the following formula defined in 3GPP specification) with 'f12'.

if $(L_{RBs}-1) \leq \lfloor N_{BWP}^{size}/2 \rfloor$ then $RIV = N_{BWP}^{size}(L_{RBs}-1) + RB_{start}$ else $$RIV = N_{BWP}^{size}(N_{BWP}^{size} - L_{RBs} + 1) + (N_{BWP}^{size} - 1 - RB_{start})$$

where $L_{RBs} \geq 1$ and shall not exceed $N_{BWP}^{size} - RB_{start}$.

With respect to time domain, a number of time domain resource of the third resource may be determined according to the smaller one of time domain resource of the first resource of the first BWP and time domain resource of the second resource of the specific second BWP. In particular, the UE 101 may determine which of a number 'T11' of time domain resource of the first resource and a number 'T12' of time domain resource of the second resource is smaller. When 'T11' is smaller than 'T12', the UE 101 may determine a number 'T13' of time domain resource of the third resource as the same as 'T11'. When 'T12' is smaller than 'T11', the UE 101 may determine 'T13' as the same as 'T12'.

Accordingly, the UE 101 may determine the frequency domain resource and the time domain resource of the third resource used within the first BWP and the specific second BWP. It should be noted that the unit of the frequency domain resource may include subcarrier or virtual resource block (VRB), and the unit of the time domain resource may include symbol or slot. Further, a resource may be determined in both the first BWP and the specific second BWP with same frequency domain and time domain size of the third resource, which may not have same starting time domain or frequency domain resource.

In some implementations, the third resource may be determined according to both frequency domain resource and time domain resource for each of the first BWP and the specific second BWP.

In particular, the UE 101 may determine a number 'F21' of frequency domain resource and a number 'T21' of time domain resource of the first resource (F21*T21) of the first BWP. The UE 101 may determine a number 'F22' of frequency domain resource and a number 'T22' of time domain resource of the second resource (F22*T22) of the specific second BWP.

When F21*T21 is greater than F22*T22, the UE 101 may be allocated with the third resource within the first BWP and may be allocated with the second resource within the second BWP as follows:
(1) if F21 is greater than F22 and T21 is less than T22, frequency domain resource of the third resource is a max value of F satisfying a) F is less than F21 and b) F*T21 is equal to or less than F22*T22; where F is a nature number.
(2) if F21 is less than F22 and T21 is greater than T22, time domain resource of the third resource is a max value of T satisfying a) T is less than T21 and b) F*T21 is equal to or less than F22*T22; where T is a nature number.
(3) if F21 is greater than F22 and T21 is greater than T22, frequency domain resource of the third resource is F22 and time domain resource of the third resource is T22.

When F22*T22 is greater than F21*T21, the UE 101 may be allocated with the first resource within the first BWP and may be allocated with the third resource within the second BWP as follows:
(1) if F22 is greater than F21 and T22 is less than T21, frequency domain resource of the third resource is a max value of F satisfying a) F is less than F22 and b) F*T22 is equal to or less than F21*T21; where F is a nature number.
(2) if F22 is less than F21 and T22 is greater than T21, time domain resource of the third resource is a max value of T satisfying a) T is less than T22 and b) F*T22 is equal to or less than F21*T21; where T is a nature number.
(3) if F22 is greater than F21 and T22 is greater than T21, frequency domain resource of the third resource is F21 and time domain resource of the third resource is T21.

Accordingly, the UE 101 may determine the frequency domain resource and the time domain resource of the third resource used within the first BWP or the specific second BWP.

Figure 7:
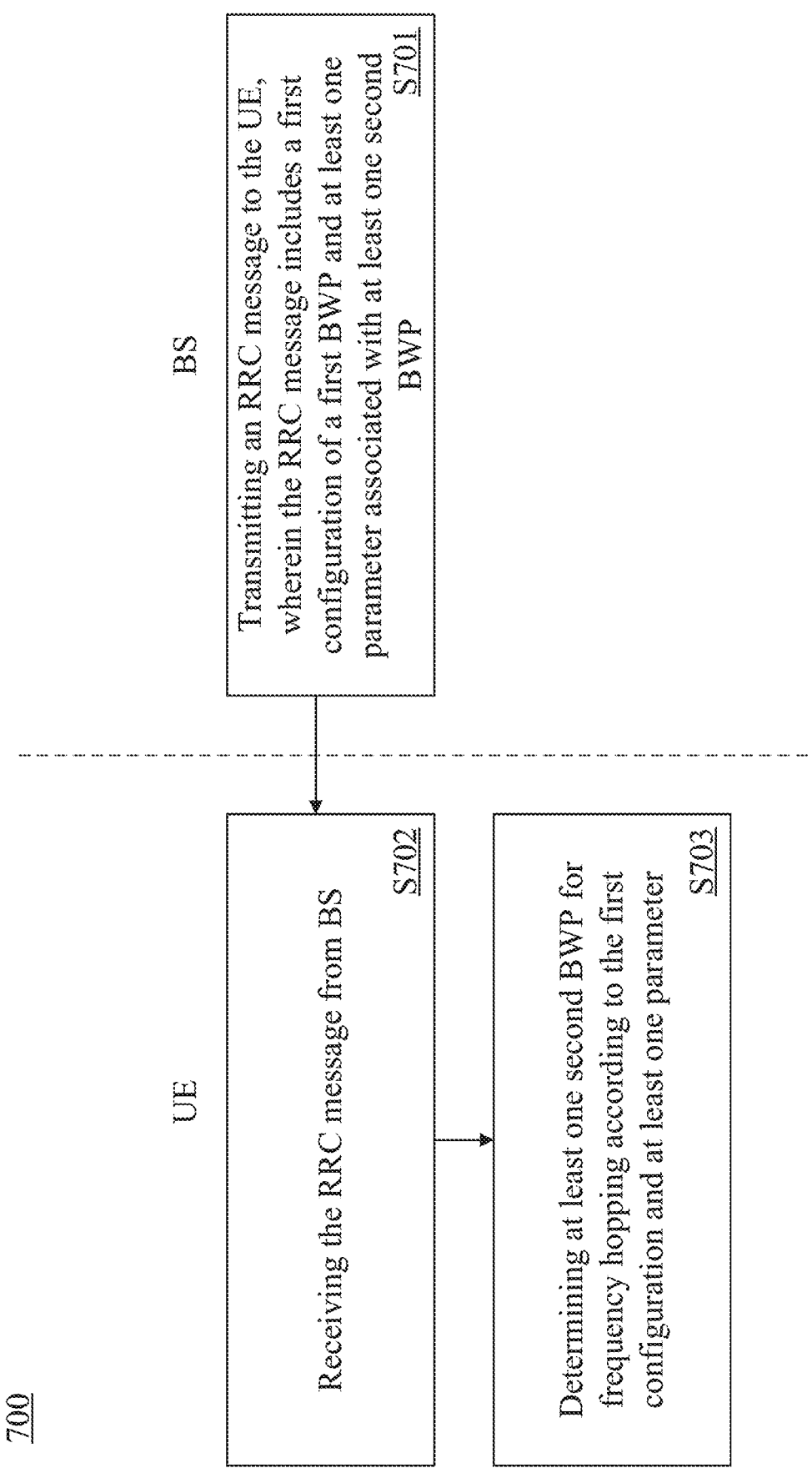
FIG. 7 illustrates a flow chart of a method for wireless communications according to an embodiment of the present disclosure.

FIG. 7 illustrates a flow chart of a method for wireless communications in accordance with some embodiments of the present application. Referring to FIG. 7, method 700 is performed by a UE (e.g., UE 101) and a BS (e.g., BS 102) in some embodiments of the present application.

Operation S701 is executed to transmit, by the BS, an RRC message to the UE. The RRC message may include a first configuration of a first BWP and at least one parameter associated with at least one second BWP. Operation S702 is executed to receive, by the UE, the RRC message. Operation S703 is executed to determine, by the UE, at least one second BWP for frequency hopping according to the first configuration and at least one parameter.

FIGS. 8A to 8D illustrate flow charts of a method for wireless communications in accordance with some embodiments of the present application. Referring to FIGS. 8A to 8D, method 800 is performed by a UE (e.g., UE 101) and a BS (e.g., BS 102) in some embodiments of the present application.

Operation 801 is executed to transmit, by the BS, an RRC message to the UE. The RRC message may include a first configuration of a first BWP and a second configuration of a specific second BWP of at least one second BWP for frequency hopping. The first configuration may include a first frequency domain location of the first BWP. The second configuration may include the at least one parameter associated with the specific second BWP, and the at least one parameter may include a BWP identifier and an offset.

Operation S802 is executed to receive, by the UE, the RRC message. Operation S803 is executed to determine, by the UE, a second frequency domain location of the specific second BWP for frequency hopping according to the first frequency domain location of the first BWP and the offset.

In some implementations, the first configuration may further include a first bandwidth, a first cyclic prefix and a first subcarrier spacing of the first BWP. Please refer to FIG. 8B, operation S803 may further include a sub-operation S803A. Operation S803A is executed to determine, by the UE, a second bandwidth, a second cyclic prefix and a second subcarrier spacing of the specific second BWP for frequency hopping according to the first bandwidth, the first cyclic prefix and the first subcarrier spacing of the first BWP.

In some implementations, the second configuration may be without a specific parameter for the specific second BWP (i.e., the specific parameter for the specific second BWP is absent in the second configuration). Please refer to FIG. 8C, operation S803 may further include a sub-operation S803B. Operation S803B is executed to determine, by the UE, the specific parameter for the specific second BWP according to a corresponding parameter of the first configuration or according to a default parameter.

In some implementations, the second configuration may be without the specific parameter of control channel configuration for the specific second BWP. The specific second BWP may be determined without the specific parameter of control channel configuration.

Figure 8A:
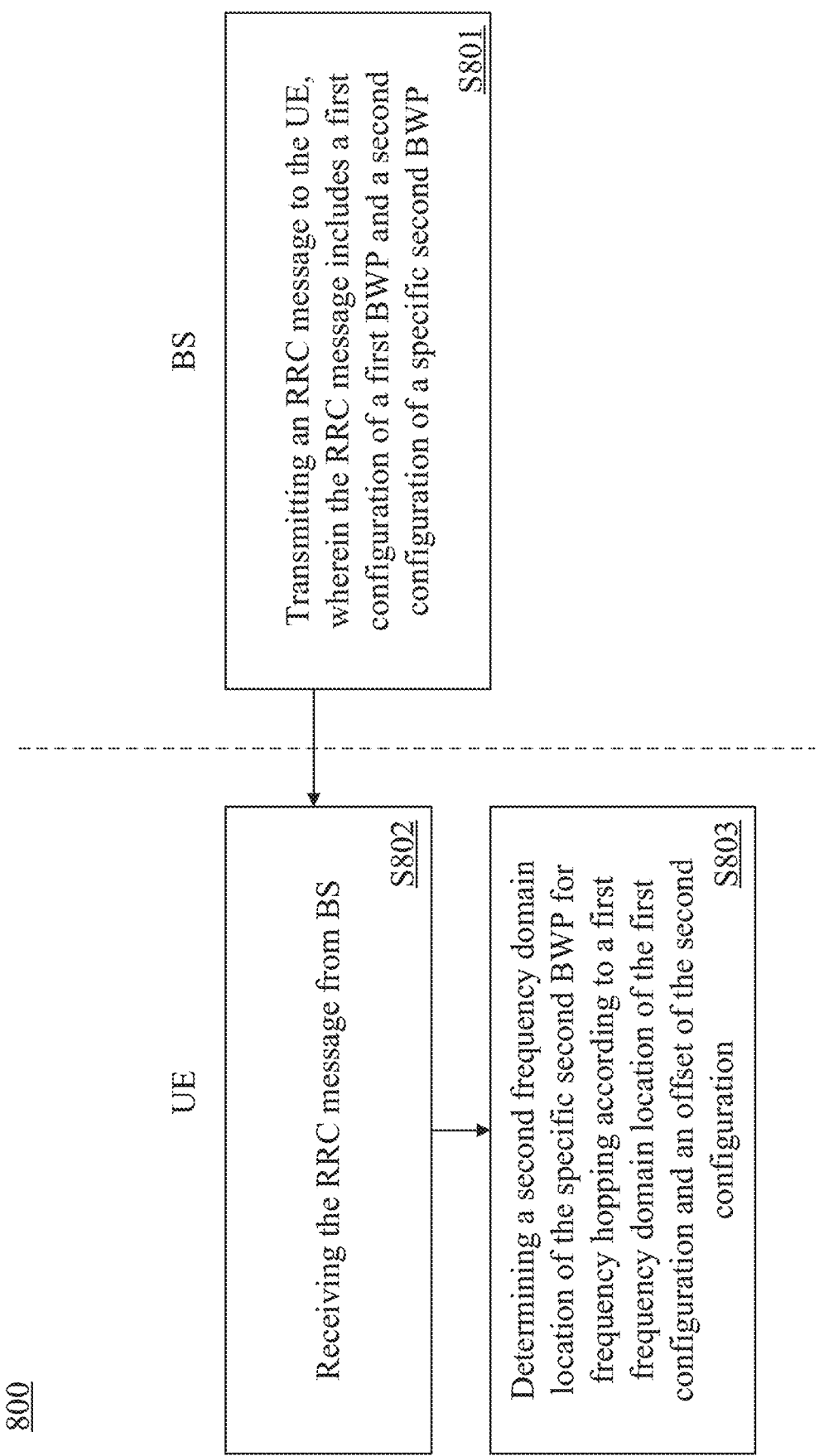
Figure 8D:
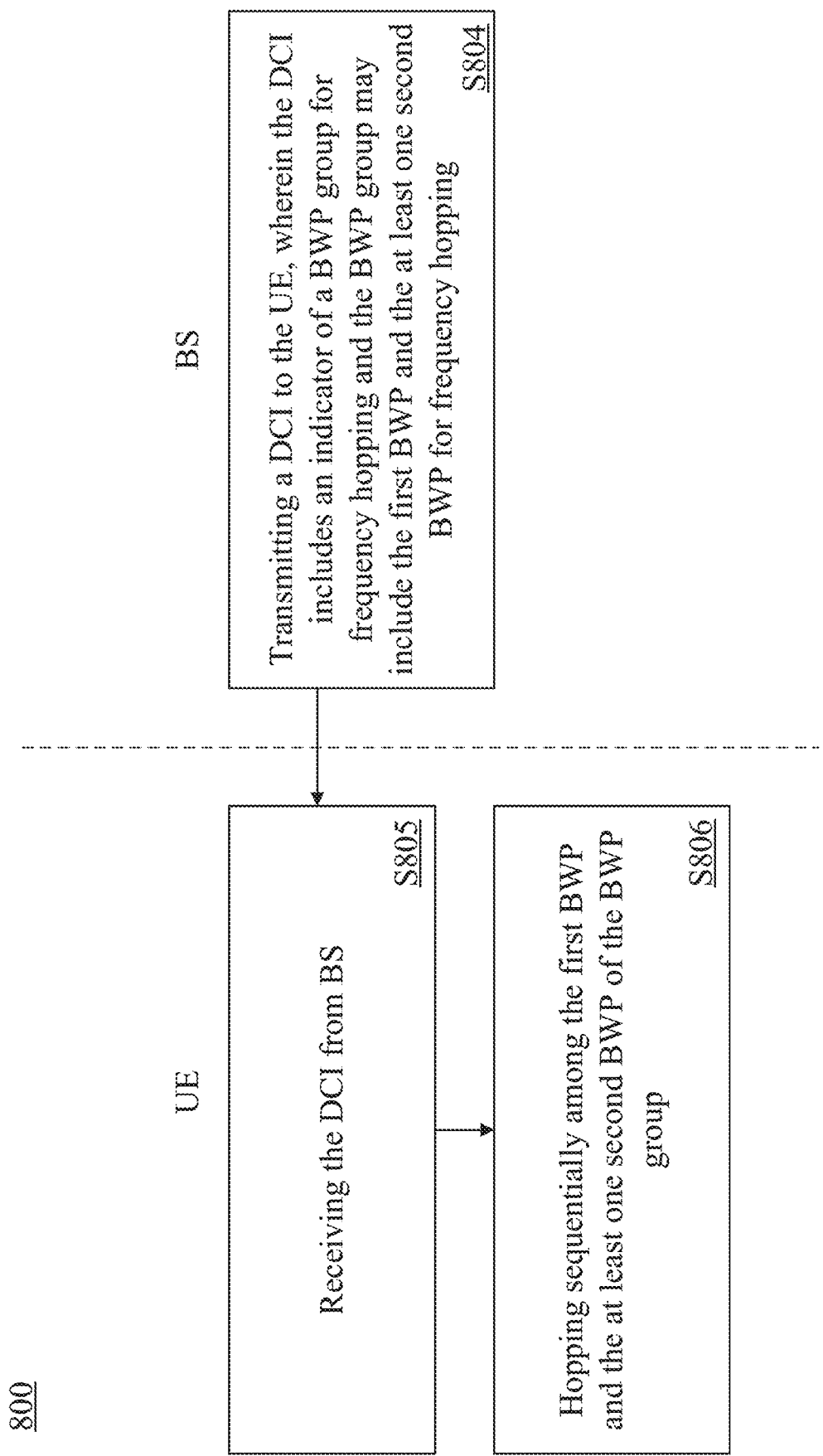

In some implementations, please refer to FIG. 8D, the method may further include operations S804 to S806. Operation S804 is executed to transmit, by the BS, a DCI to the UE. The DCI may include an indicator of a BWP group for frequency hopping and the BWP group may include the first BWP and the at least one second BWP for frequency hopping. Operation S805 is executed to receive, by the UE, the DCI. S806 is executed to hop, by the UE, sequentially among the first BWP and the at least one second BWP of the BWP group.

Figure 9:
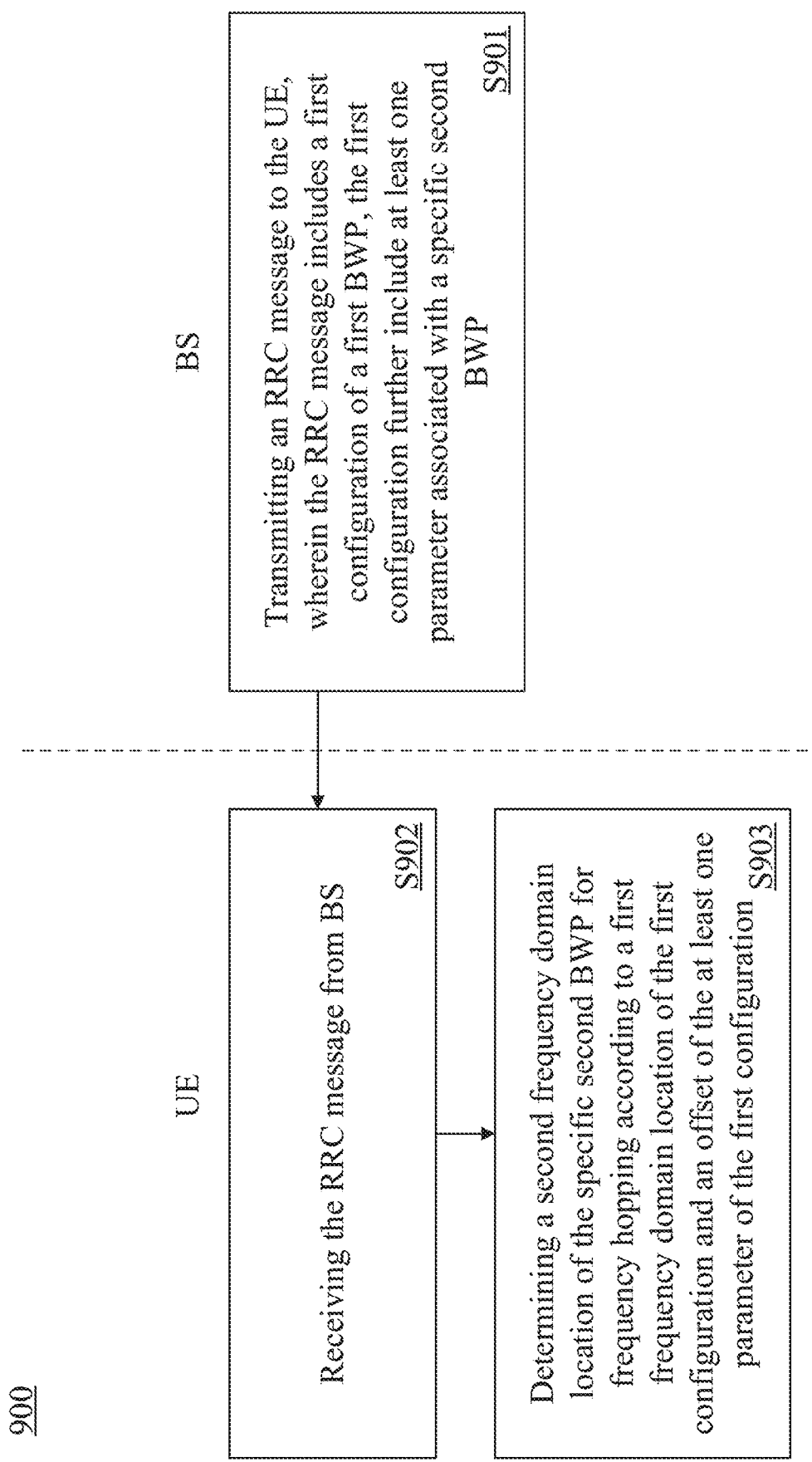
FIG. 9 illustrates a flow chart of a method for wireless communications according to an embodiment of the present disclosure.

FIG. 9 illustrates a flow chart of a method for wireless communications in accordance with some embodiments of the present application. Referring to FIG. 9, method 900 is performed by a UE (e.g., UE 101) and a BS (e.g., BS 102) in some embodiments of the present application.

Operation 901 is executed to transmit, by the BS, an RRC message to the UE. The RRC message may include a first configuration of a first BWP. The first configuration may include a first frequency domain location of the first BWP and at least one parameter associated with a specific second BWP of at least one second BWP for frequency hopping. The at least one parameter may include an offset.

Operation S902 is executed to receive, by the UE, the RRC message. Operation S903 is executed to determine, by the UE, a second frequency domain location of the specific second BWP for frequency hopping according to the first frequency domain location of the first BWP and the offset.

In some implementations, the at least one parameter may further include a specific parameter for the specific second BWP. The specific second BWP may be determined with the specific parameter.

Figure 10A:
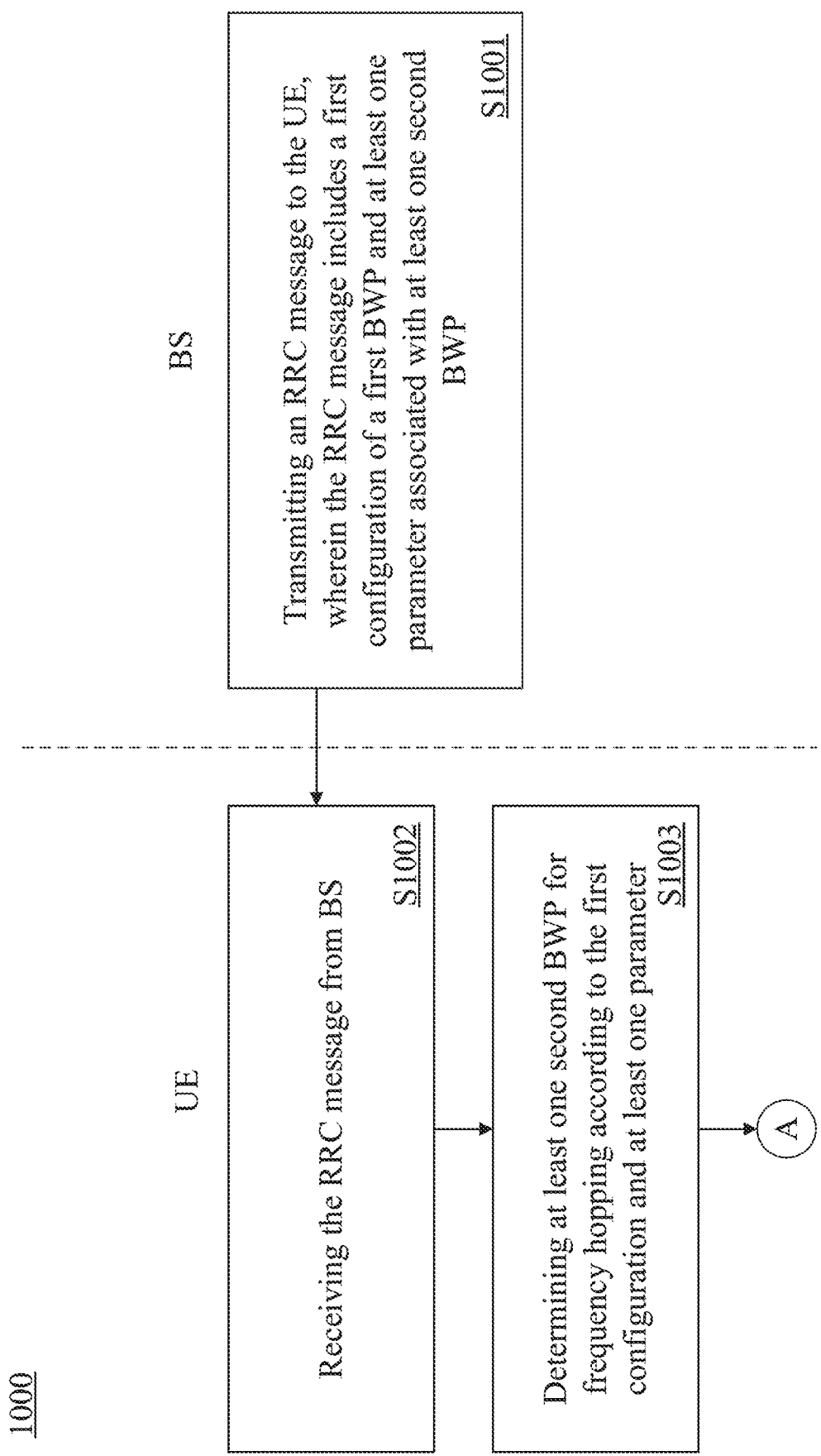
FIGS. 10A and 10B illustrate flow charts of a method for wireless communications according to an embodiment of the present disclosure.
Figure 10B:
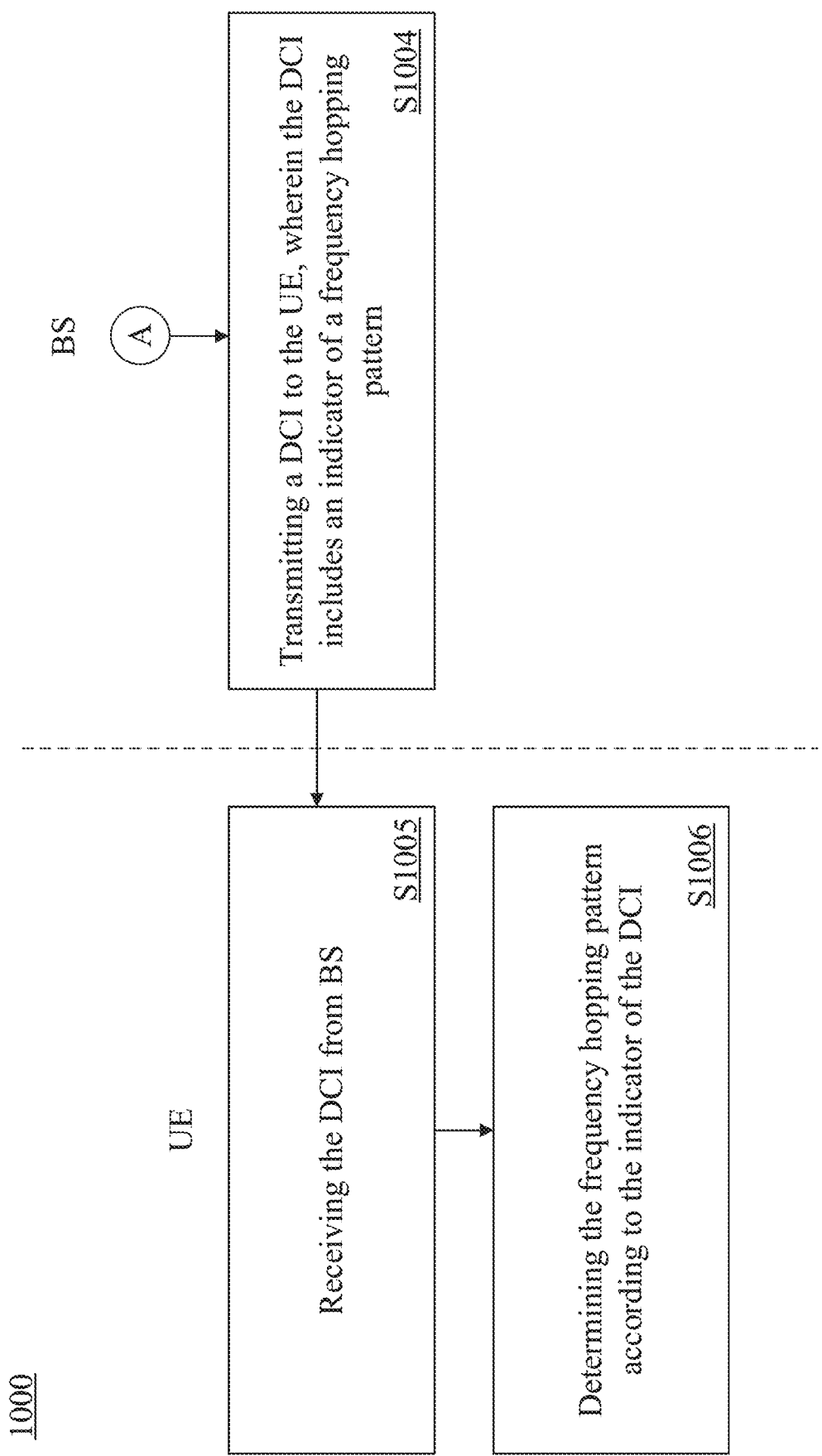

FIGS. 10A and 10B illustrate flow charts of a method for wireless communications in accordance with some embodiments of the present application. Referring to FIGS. 10A and 10B, method 1000 is performed by a UE (e.g., UE 101) and a BS (e.g., BS 102) in some embodiments of the present application.

Operation S1001 is executed to transmit, by the BS, an RRC message to the UE. The RRC message may include a first configuration of a first BWP and at least one parameter associated with at least one second BWP. The at least one parameter may be included in at least one configuration of the at least one second BWP or be included in the first configuration of the first BWP. Operation S1002 is executed to receive, by the UE, the RRC message. Operation S1003 is executed to determine, by the UE, at least one second BWP for frequency hopping according to the first configuration and at least one parameter.

Operation S1004 is executed to transmit, by the BS, a DCI to the UE. The DCI may include an indicator of a frequency hopping pattern. The indicator may indicate a BWP for frequency hopping or indicate a BWP pattern for frequency hopping. Operation S1005 is executed to receive, by the UE, the DCI. Operation S1006 is executed to determine, by UE, the frequency hopping pattern according to the indicator of the DCI.

In some implementations, the indicator may include a number N of MSB bits of 'frequency domain resource assignment' field of the DCI. The number N may be determined according to number of BWP or number of BWP group configured to the UE. In some implementations, the indicator may be 'bandwidth part indicator' field of the DCI. a new flag bit in DCI may indicate 'bandwidth part indicator' field used for BWP switching or frequency hopping.

Figure 11:
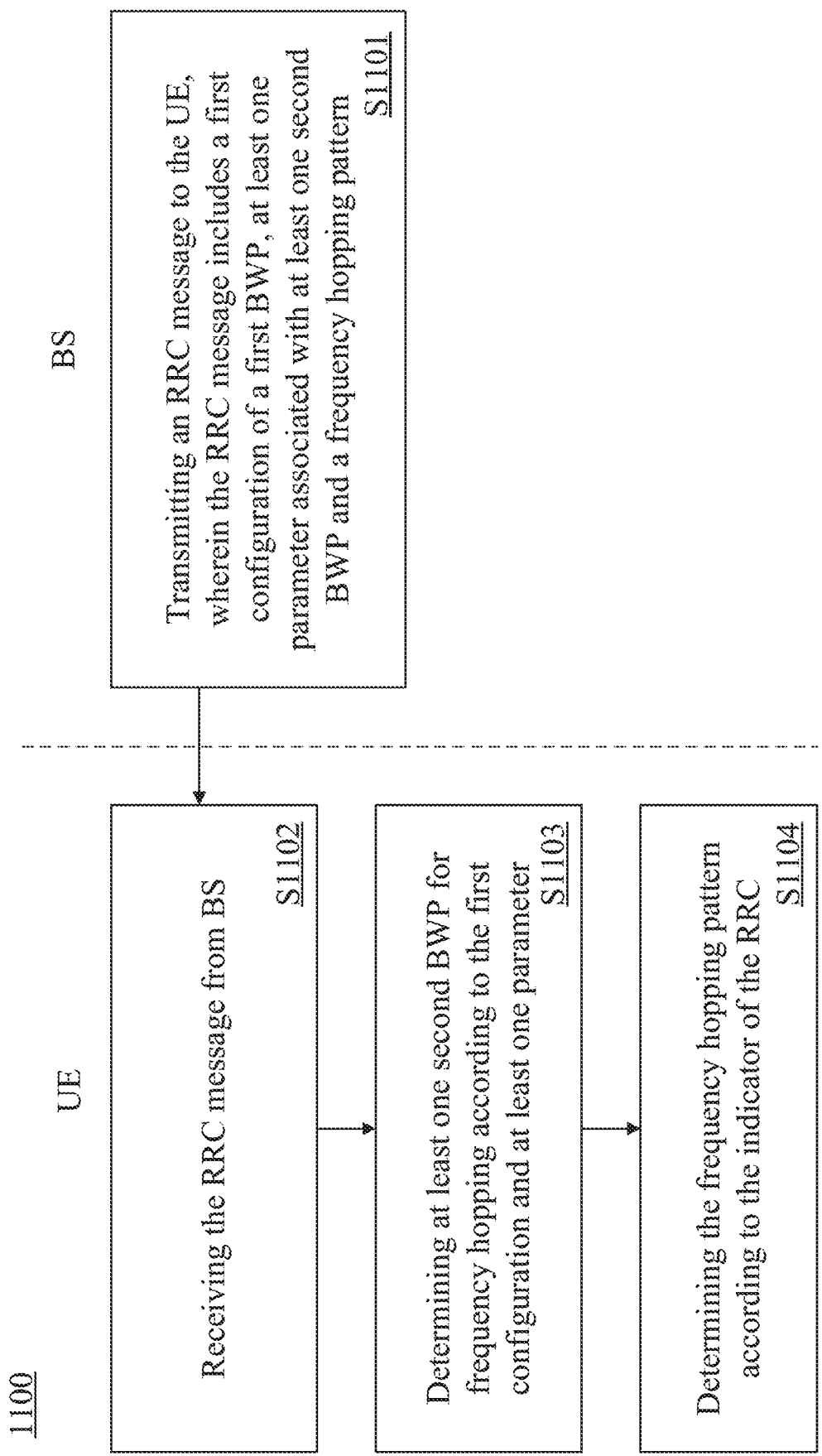
FIG. 11 illustrates a flow chart of a method for wireless communications according to an embodiment of the present disclosure.

FIG. 11 illustrates a flow chart of a method for wireless communications in accordance with some embodiments of the present application. Referring to FIG. 11, method 1100 is performed by a UE (e.g., UE 101) and a BS (e.g., BS 102) in some embodiments of the present application.

Operation S1101 is executed to transmit, by the BS, an RRC message to the UE. The RRC message may include a first configuration of a first BWP, at least one parameter associated with at least one second BWP and a frequency hopping pattern. The at least one parameter may be included in at least one configuration of the at least one second BWP or be included in the first configuration of the first BWP. Operation S1102 is executed to receive, by the UE, the RRC message.

Operation S1103 is executed to determine, by the UE, at least one second BWP for frequency hopping according to the first configuration and at least one parameter. Operation S1104 is executed to determine, by the UE, the frequency hopping pattern according to the RRC message.

Figure 12:
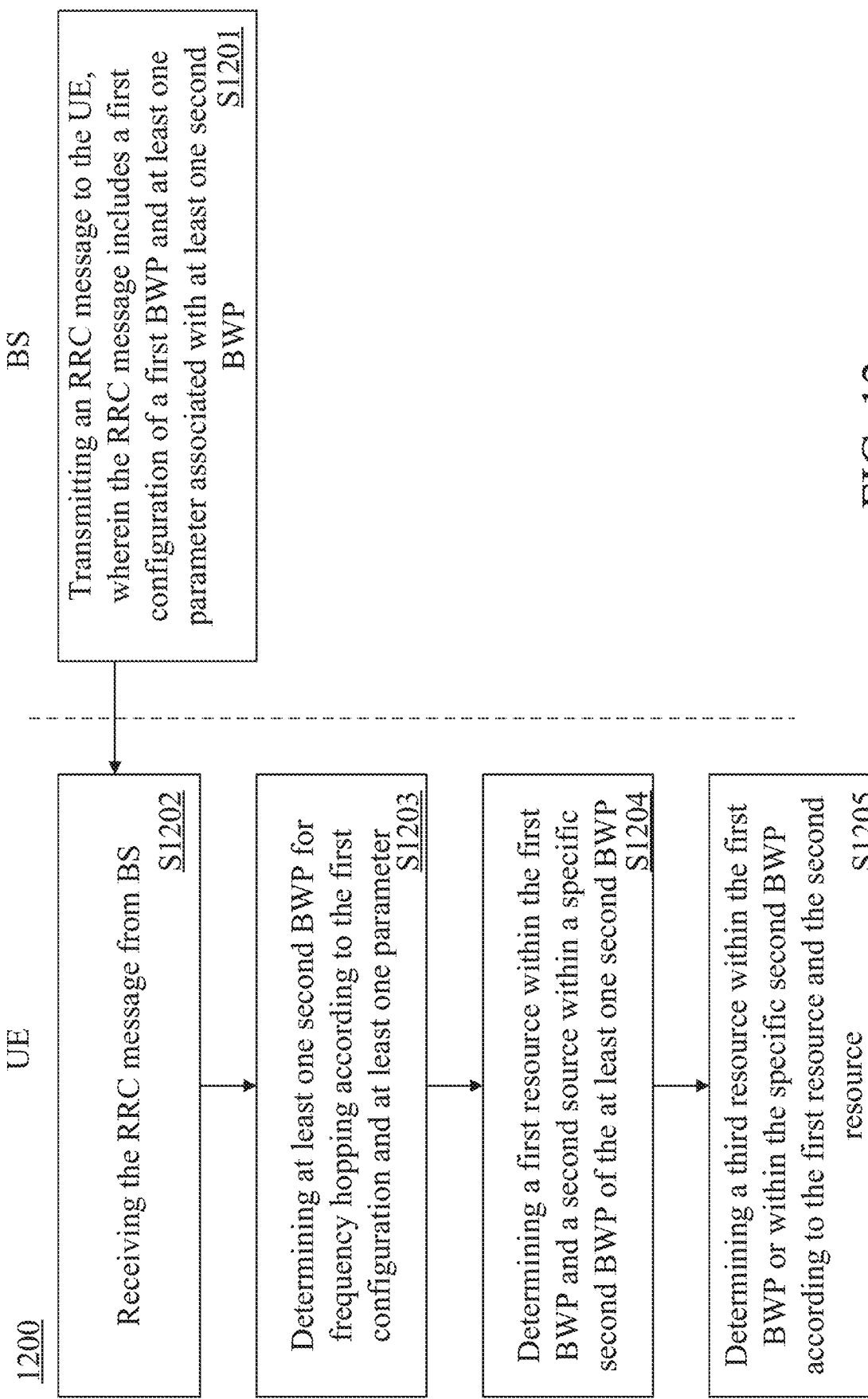
FIG. 12 illustrates a flow chart of a method for wireless communications according to an embodiment of the present disclosure.

FIG. 12 illustrates a flow chart of a method for wireless communications in accordance with some embodiments of the present application. Referring to FIG. 12, method 1200 is performed by a UE (e.g., UE 101) and a BS (e.g., BS 102) in some embodiments of the present application.

Operation S1201 is executed to transmit, by the BS, an RRC message to the UE. The RRC message may include a first configuration of a first BWP and at least one parameter associated with at least one second BWP. The at least one parameter may be included in at least one configuration of the at least one second BWP or be included in the first configuration of the first BWP. Operation S1202 is executed to receive, by the UE, the RRC message. Operation S1203 is executed to determine, by the UE, at least one second BWP for frequency hopping according to the first configuration and at least one parameter.

Operation S1204 is executed to determine, by the UE, a first resource within the first BWP and a second source within a specific second BWP of the at least one second BWP. Operation S1205 is executed to determine, by the UE, a third resource within the first BWP or within the specific second BWP according to the first resource and the second resource.

In some implementations, a number F33 of frequency domain resource of the third resource may be the smaller one among a number F31 of frequency domain resource of the first resource and a number F32 of frequency domain resource of the second resource, where F31, F32, F33 are natural numbers.

In some implementations, a number T33 of time domain resource of symbol of the third resource may be the smaller one among a number T31 of time domain resource of the first resource and a number T32 of time domain resource of the second resource, where T31, T32, T33 are natural numbers.

In some implementations, a number F43 and a starting of the frequency domain resource of the third resource may be determined by the smaller one among a number F41 of frequency domain resource of the first BWP and a number F42 of frequency domain resource of the specific second BWP, where F41, F42, F43 are natural numbers.

In some implementations, a number F53 of frequency domain resource of the third resource may be determined according to the second resource and a number T51 of time domain resource of the first resource, where T51, F53 are natural numbers.

In some implementations, a number T53 of time domain resource of the third resource is determined according to the second resource and a number F51 of frequency domain resource of the first resource, where F51, T53 are natural numbers.

Figure 13:
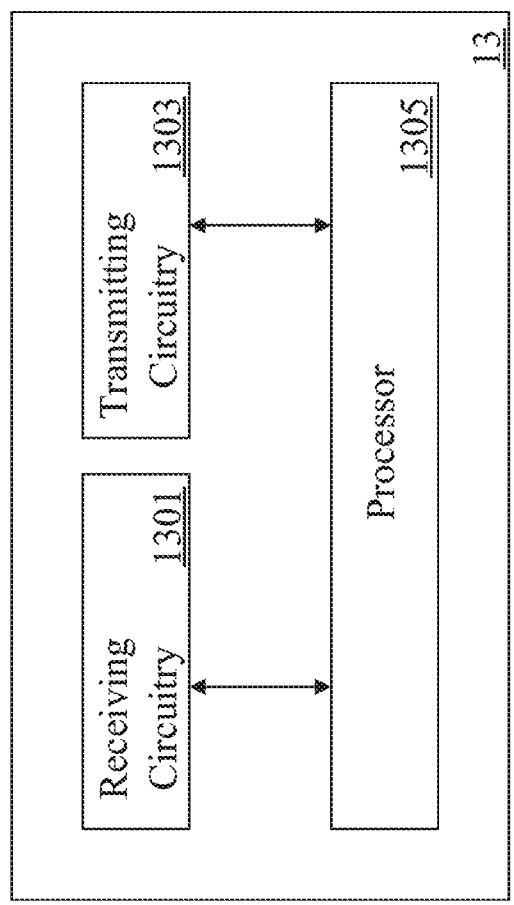
FIG. 13 illustrates an example block diagram of an apparatus according to an embodiment of the present disclosure.

FIG. 13 illustrates an example block diagram of an apparatus 13 according to an embodiment of the present disclosure.

As shown in FIG. 13, the apparatus 13 may include at least one non-transitory computer-readable medium (not illustrated in FIG. 13), a receiving circuitry 1301, a transmitting circuitry 1303, and a processor 1305 coupled to the non-transitory computer-readable medium (not illustrated in FIG. 13), the receiving circuitry 1301 and the transmitting circuitry 1303. The apparatus 13 may be a user equipment or a base station.

Although in this figure, elements such as processor 1305, transmitting circuitry 1303, and receiving circuitry 1301 are described in the singular, the plural is contemplated unless limitation to the singular is explicitly stated. In some embodiments of the present disclosure, the receiving circuitry 1301 and the transmitting circuitry 1303 are combined into a single device, such as a transceiver. In certain embodiments of the present disclosure, the apparatus 13 may further include an input device, a memory, and/or other components.

In some embodiments of the present disclosure, the non-transitory computer-readable medium may have stored thereon computer-executable instructions to cause a processor to implement the method with respect to the base station as described above. For example, the computer-executable instructions, when executed, cause the processor 1305 interacting with receiving circuitry 1301 and transmitting circuitry 1303, so as to perform the operations with respect to BS depicted in FIGS. 1 to 4.

In some embodiments of the present disclosure, the non-transitory computer-readable medium may have stored thereon computer-executable instructions to cause a processor to implement the method with respect to the user equipment as described above. For example, the computer-executable instructions, when executed, cause the processor 1305 interacting with receiving circuitry 1301 and transmitting circuitry 1303, so as to perform the operations with respect to UE depicted in FIGS. 1 to 4.

Those having ordinary skill in the art would understand that the operations of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes", "including", or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a", "an", or the like does not, without more constraints, preclude the existence of additional identical elements in the process, method, article, or apparatus that includes the element. Also, the term "another" is defined as at least a second or more. The term "having" and the like, as used herein, are defined as "including".

We claim:

1. A user equipment (UE) for wireless communication, comprising:
    at least one memory; and
    at least one processor coupled with the at least one memory and configured to cause the UE to:
        receive a first configuration of a first bandwidth part (BWP),
            wherein the first configuration includes a first frequency domain location, a first bandwidth, a first cyclic prefix and a first subcarrier spacing (SCS) of the first BWP;
        receive a second configuration of a second BWP,
            wherein the second configuration includes a BWP identifier and an offset;
        determine a second frequency domain location for the second BWP for frequency hopping according to the first configuration and the offset; and
        determine a second bandwidth, a second cyclic prefix, and an SCS of the second BWP for frequency hopping according to the first bandwidth, the first cyclic prefix and the first SCS of the first BWP.

2. The UE of claim 1, wherein, to determine the second BWP, the at least one processor is configured to cause the UE to:
    determine the second frequency domain location of the second BWP for frequency hopping according to the first frequency domain location of the first BWP and the offset.

3. The UE of claim 2, wherein the second configuration is without a specific parameter for the second BWP, and wherein to determine the second BWP, the at least one processor is configured to cause the UE to:
    determine a parameter for the second BWP according to a corresponding parameter of the first configuration or according to a default parameter, or
    determine the second BWP without the specific parameter.

4. The UE of claim 1, wherein the at least one processor is configured to cause the UE to:
    receive a downlink control information (DCI), wherein the DCI includes an indicator of a BWP group for frequency hopping, and the BWP group includes the first BWP and the second BWP; and
    hop sequentially among the first BWP and the second BWP of the BWP group.

5. The UE of claim 2, wherein the at least one processor is further configured to cause the UE to:
    determine a frequency hopping pattern across BWPs.

6. The UE of claim 5, wherein the at least one processor is further configured to cause the UE to:
receive a downlink control information (DCI),
wherein the DCI includes an indicator of the frequency hopping pattern, and the indicator indicates a BWP for frequency hopping, or
wherein the DCI includes an indicator of the frequency hopping pattern, and the indicator indicates a BWP pattern for frequency hopping.

7. The UE of claim 5, wherein the frequency hopping pattern across BWPs is determined according to a radio resource control (RRC) message.

8. The UE of claim 1, wherein the at least one processor is further configured to cause the UE to:
determine a first resource within the first BWP and a second resource within the second BWP;
determine a third resource within the first BWP or within the second BWP according to the first resource and the second resource.

9. A method, comprising:
receiving a first configuration of a first bandwidth part (BWP),
wherein the first configuration includes a first frequency domain location, a first bandwidth, a first cyclic prefix and a first subcarrier spacing (SCS) of the first BWP;
receiving a second configuration of a second BWP,
wherein the second configuration includes a BWP identifier and an offset; and
determining a second frequency domain location for the second BWP for frequency hopping according to the first configuration and the offset; and
determining a second bandwidth, a second cyclic prefix, and an SCS of the second BWP for frequency hopping according to the first bandwidth, the first cyclic prefix and the first SCS of the first BWP.

10. The method of claim 9, wherein determining the second BWP comprises:
determining the second frequency domain location of the specific second BWP for frequency hopping according to the first frequency domain location of the first BWP and the offset.

11. The method of claim 10, wherein the second configuration is without a specific parameter for the second BWP, and wherein determining the second BWP comprises:
determining a parameter for the second BWP according to a corresponding parameter of the first configuration or according to a default parameter, or
determining the second BWP without the specific parameter.

12. The method of claim 9, further comprising:
receiving a downlink control information (DCI), wherein the DCI includes an indicator of a BWP group for frequency hopping, and wherein the BWP group includes the first BWP and the second BWP; and
hopping sequentially among the first BWP and the second BWP of the BWP group.

13. The method of claim 9, further comprising:
determining a frequency hopping pattern across BWPs.

14. The method of claim 13, further comprising:
receiving a downlink control information (DCI),
wherein the DCI includes an indicator of the frequency hopping pattern, and the indicator indicates a BWP for frequency hopping, or
wherein the DCI includes an indicator of the frequency hopping pattern, and the indicator indicates a BWP pattern for frequency hopping.

15. The method of claim 9, further comprising:
determining a first resource within the first BWP and a second resource within the second BWP;
determining a third resource within the first BWP or within the second BWP according to the first resource and the second resource.

* * * * *